(12) United States Patent
Pandit et al.

(10) Patent No.: US 10,229,185 B2
(45) Date of Patent: Mar. 12, 2019

(54) METHOD AND SYSTEM FOR CONFIGURATION MANAGEMENT OF HIERARCHICALLY-ORGANIZED UNSTRUCTURED DATA USING ASSOCIATIVE TEMPLATES

(71) Applicant: Veritas Technologies LLC, Mountain View, CA (US)

(72) Inventors: Bhushan Pandit, Maharashtra (IN); Andrew James Nash, Reading (GB)

(73) Assignee: Veritas Technologies LLC, Santa Clara, CA (US)

( * ) Notice: Subject to any disclaimer, the term of this patent is extended or adjusted under 35 U.S.C. 154(b) by 699 days.

(21) Appl. No.: 14/839,010

(22) Filed: Aug. 28, 2015

(65) Prior Publication Data

US 2017/0004203 A1    Jan. 5, 2017

(30) Foreign Application Priority Data

Jun. 30, 2015   (IN) .......................... 2487/MUM/2015

(51) Int. Cl.
*G06F 17/30* (2006.01)
(52) U.S. Cl.
CPC ............................. *G06F 17/30619* (2013.01)

(58) Field of Classification Search
CPC ................................................ G06F 17/30619
See application file for complete search history.

(56) References Cited

U.S. PATENT DOCUMENTS

| 6,834,301 B1* | 12/2004 | Hanchett | ............. H04L 41/0233 705/1.1 |
| 2004/0049505 A1* | 3/2004 | Pennock | ........... G06F 17/30592 707/999.005 |
| 2013/0311463 A1* | 11/2013 | Werner | ............. G06F 17/30604 707/736 |

* cited by examiner

*Primary Examiner* — Dinku W Gebresenbet
(74) *Attorney, Agent, or Firm* — Campbell Stephenson LLP

(57) ABSTRACT

Various systems, methods, and computer program products are disclosed for performing configuration management functionality on hierarchically-organized unstructured data using associative templates. Such methods, computer program products, and computer systems include identifying a node in the associative template and setting a configuration parameter to a parameter value, based on a template association. The node in the associative template is a node in a hierarchy of an associative template. The identifying indicates a template association between the node in the associative template and a node in a hierarchy of hierarchically-organized unstructured data (HOUD). The parameter value is maintained in the node in the associative template, and the node comprises the configuration parameter.

20 Claims, 15 Drawing Sheets

METHOD AND SYSTEM FOR CONFIGURATION MANAGEMENT OF HIERARCHICALLY-ORGANIZED UNSTRUCTURED DATA USING ASSOCIATIVE TEMPLATES

CROSS-REFERENCE TO RELATED APPLICATIONS

This application claims benefit under 35 U.S.C § 119(a) of Indian Provisional Patent Application No. 2487/MUM/2015, filed in India on Jun. 30, 2015, entitled "Method And System for Configuration Management of Hierarchically-Organized Unstructured Data Using Associative Templates," and having B. Pandit and A Nash as inventors. The above-referenced application is hereby incorporated by reference herein, in its entirety and for all purposes.

FIELD OF THE DISCLOSURE

The present disclosure relates to configuration management, and more particularly, to method and system for configuration management of hierarchically-organized unstructured data using associative templates.

BACKGROUND

An ever-increasing reliance on information and computing systems that produce, process, distribute, and maintain such information in its various forms, continues to put great demands on techniques for providing data storage, access to that data storage, and management of the data thus stored. Business organizations, government organizations, and other organizations, and even individuals, can produce (and so, need to retain) large amounts of data. While data growth is not new, the pace of data growth has become more rapid, the location of data more dispersed, and linkages between data sets more complex, with each passing day.

As will be appreciated, then, this leaves today's organizations and individuals facing something of a crisis. Many organizations and individuals have been assiduously and comprehensively storing data for years. The problem is, these organizations and individuals are ill-equipped to manage such massive collections of data. In this regard, nowhere is today's rapid growth in data felt more keenly than in the exponential growth of unstructured data.

Unstructured data is a group of data items that is irregular in some way, such that the data items are not described by a pre-defined data model. As such, unstructured data does not reside in a traditional row-column database, spreadsheet, or comparable form, which results in irregularities that make unstructured data difficult to manage. By contrast, structured data is maintained in a strictly regular arrangement of data (e.g., that adheres to a pre-defined data model of some sort). Thus, a fundamental difference between structured and unstructured data is that structured data is organized in a highly regular, mechanical, and manageable manner, while unstructured data is not. Further, while unstructured data can include structured data (e.g., a database or spreadsheet among a number of other files in a filesystem directory), unstructured data will include at least some data that is irregular in some way. Even data that is structured in one or more certain aspects is still characterized as unstructured, particularly if the data's structure is not useful for the processing task at hand.

Compounding such challenges is the fact that unstructured data typically grows in both extent and complexity. It is estimated that somewhere around 80-90% of potentially usable business information exists unstructured form, and that unstructured data makes up 70%-80% of all data in organizations. Even if such unstructured data is not voluminous to begin with, the larger the unstructured data becomes, the worse the problem of managing such unstructured data becomes. In this regard, for such large sets of unstructured data, the management of configure settings on individual data items is typically quite challenging. This is true even where there is only a limited set of configuration patterns to be followed. Complicating matters is the fact that, even if the unstructured data is organized in some fashion (e.g., a directory structure), any such organization will inevitably change over time, and often, will do so quickly.

It is therefore desirable to provide a mechanism by which various configuration settings can be enforced on unstructured data. Further, such mechanisms should provide such functionality in a scalable and efficient manner, despite the need to provide configuration management for large amounts of unstructured data.

SUMMARY

The present disclosure describes methods, computer program products, computer systems, and the like are disclosed that provide for configuration management. Such methods, computer program products, and computer systems include identifying an associative template node and setting a configuration parameter to a parameter value, based on a template association. The associative template node is a node in a hierarchy of an associative template. The identifying indicates a template association between the associative template node and a node in a hierarchy of hierarchically-organized unstructured data (HOUD). The parameter value is maintained in the associative template node, and the node comprises the configuration parameter.

In certain embodiments, such methods, computer program products, computer systems, and the like can include identifying a target node in the HOUD as a template apply point, selecting a child node of the target node, determining configuration setting to use in configuring child node, and configuring child node using the configuration setting. Also provided for are identifying a target node in the hierarchy of the HOUD and determining whether the target node has the template association with the associative template node. In response to a determination that the target node has the template association with the associative template node, such embodiments can enforce a configuration set of the associative template node on the target node. In response to a determination that the target node does not have the template association with the associative template node, such embodiments can also select a parent node of the target node as a current node, and determine whether the current node is a root node of the hierarchy of the HOUD. In response to a determination that the current node is not the root node of the hierarchy of the HOUD, such embodiments can, further, determine whether the current node has the template association with the associative template node, and, in response to a determination that the current node has the template association with the associative template node, enforce a configuration set of the associative template node on the current node and/or in response to a determination that the current node is the root node of the hierarchy of the HOUD, enforce a default configuration set on the current node.

In certain embodiments, such methods, computer program products, computer systems, and the like can include determining if unstructured data is organized hierarchically, and, in response to a determination that unstructured data is not organized hierarchically, form the HOUD by organizing the unstructured data hierarchically, where the forming is accomplished using a common characteristic of the unstructured data. Also provided for is defining the associative template. Such defining can include defining the hierarchy of the associative template, creating the associative template node, and setting a configuration dimension of the associative template node to a parameter value, and where defining the hierarchy of the associative template uses at least one of structural information or a hierarchical organization that resulted from an analysis of the HOUD.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the systems described herein and equivalents thereof, as defined solely by the claims, will become apparent in view of the examples described in the detailed description set forth below.

BRIEF DESCRIPTION OF THE DRAWINGS

Embodiments of methods and systems such as those disclosed herein may be better understood, and its numerous objects, features and advantages made apparent to those skilled in the art by referencing the accompanying drawings.

DETAILED DESCRIPTION

Introduction

Figure 1:
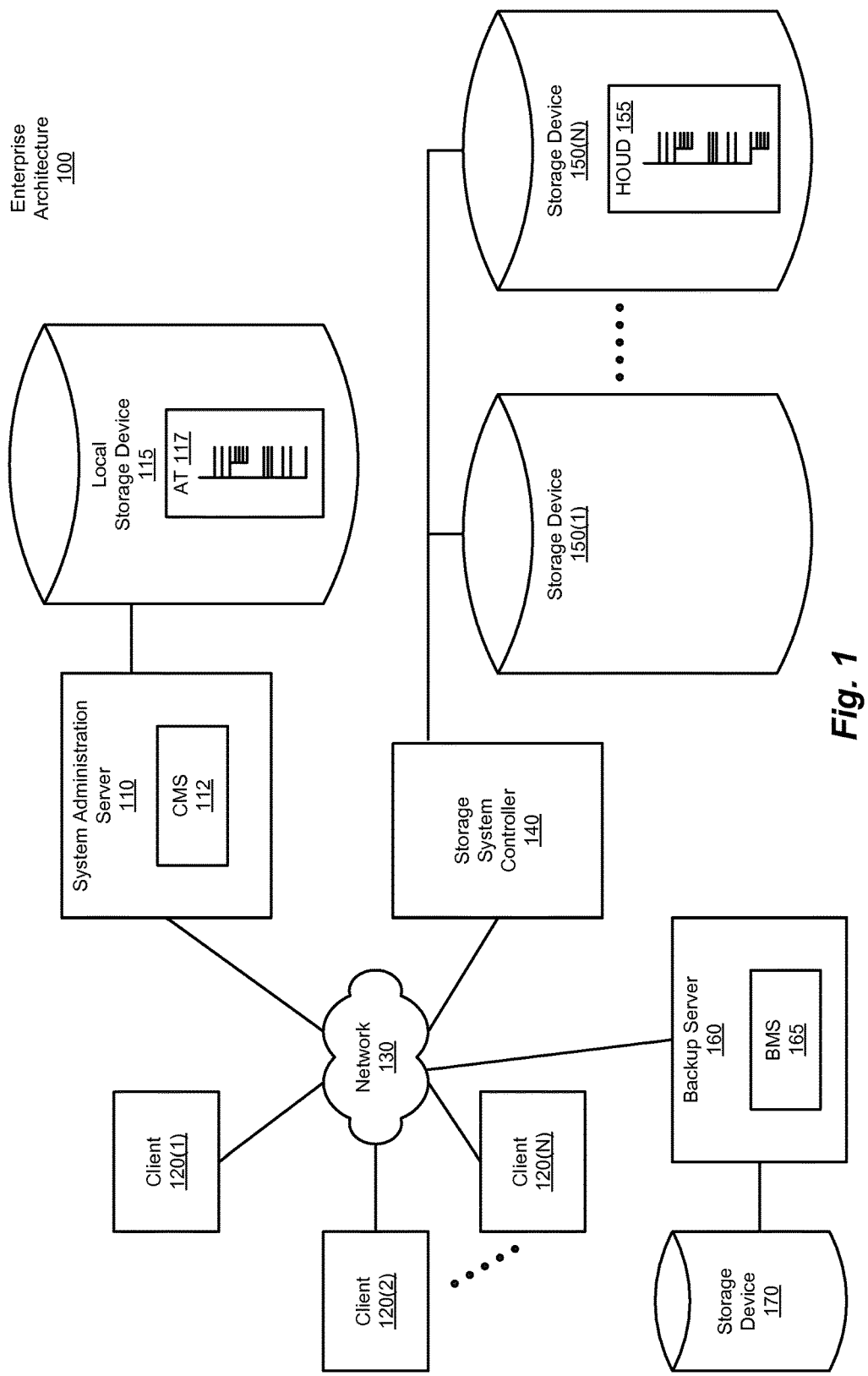
FIG. 1 is a simplified block diagram illustrating an example of an enterprise architecture, according to embodiments of methods and systems such as those disclosed herein.

Broadly, the concepts described herein are applicable to the management of configuration parameters of unstructured data. Methods and systems such as those disclosed herein provide a flexible and adaptable associative template scheme that can be used for the application of policies, rules, constraints, and other management criteria, as well as definition thereof, to organized unstructured data. Further, configurations of such organized unstructured data can be effectively and efficiently managed, even though the organization of the organized unstructured data deviates from that of the associative template. Such an approach facilitates management of unstructured data, particularly in situations in which such unstructured data becomes increasing voluminous and its organization becomes increasingly complex.

Embodiments of methods and systems such as those disclosed herein employ one or more associative templates that are organized in a manner comparable to that of the unstructured data to which they are to be applied. An associative template can be defined, for example, in the form of a hierarchical structure (e.g., an abstract data type such as a hierarchical tree structure (e.g., more generally, an "n-ary digraph"), also referred to more simply as a "tree") to represent a common pattern (or approximation thereof) of constituent sub-structures (e.g., in turn, "sub-trees") within a hierarchical storage structure containing unstructured data. Such a hierarchical tree structure can be implemented, for example, as a filesystem that includes various arrangements and types of files in one or more directories (a file system cataloging structure which can contain, for example, references to files and, possibly, other directories). The directory structure (hierarchical structure) of such filesystems can follow a standard basic structure (e.g., the Filesystem Hierarchy Standard (FHS) (a reference describing the conventions used for the layout of a UNIX filesystem)) or can be organized in an ad hoc manner. As will be appreciated, even filesystems that are structured in some regular fashion will tend to drift from such structures, particularly so in light of such filesystems' maintenance and use by individuals, organizations, groups, or other entities (which are prone to create, modify, and delete portions of such structures, often in capricious and unexpected ways). Compounding the problems such changes cause is the unstructured nature of the data stored therein, which can be of nearly any type, format, size, and so on.

As will be appreciated in light of the present disclosure, however, such a storage structure (and correspondingly, any associative template to be applied thereto) can be implemented in any structure or form convenient and advantageous to its application (e.g., some manner of graph structure). That said, if an approach is used in which a default configuration set is defined in relation to the root node of the associative template (and therefore, such default configuration set is applied in the event that traversal of the tree representing the associative template reaches such root node), such structures cannot contain loops or broken branches (e.g., such a structure adheres to the generally-accepted notion of "trees" or "forests," as per such classic abstract data structures). Alternatively, if a condition other than reaching the root node of the given associative template is used to determine whether a default configuration set is to be applied, such constraints need not be adhered to by embodiments of methods and systems such as those described herein. For example, rather than applying a default configuration set upon reaching the root node of the given associative template, other conditions might give rise to such application. By way of further example, such situations can include consideration of all nodes of a given level in the associative template, encountering a node already considered (e.g., in a circular graph of some sort), reaching some manner of limit (e.g., only a certain number of nodes will be considered before a default configuration set will be applied), or comparable conditions that might be defined with respect to a given associative template that employed a structure other than a hierarchical tree structure.

That being the case, the structure of an associative template may not correspond exactly to that of a given sub-structure in the unstructured data. For example, in the situation in which the unstructured data (and so, the one or more associative templates to be applied thereto) is organized in a hierarchical structure (e.g., a directory structure), such hierarchically-organized unstructured data (HOUD) can deviate from its original organization (and so, that of the one or more associative templates) over time (e.g., as users create, modify, and delete directories, files, and other constructs stored therein). In such a scenario, the possibilities for mismatch between the organization of the one or more associative templates and the HOUD's organization include, for example, a node that exists in one hierarchy, but not in the other. In one case, a node that exists in the HOUD might not exist in the associative template. Such missing HOUD nodes can be considered under inheritance rules. In another case, a node that exists in the associative template might not exist in the HOUD. Such missing associative template nodes can be considered as placeholders (and remain as such, until a corresponding node in the HOUD is created, while the associative template is associated with that HOUD). In this regard, embodiments of methods and systems such as those described herein can be made even more flexible through the implementation of exceptions, overrides, and associations with other criteria, permutations that would otherwise unacceptably complicate configuration management.

An example of methods and systems such as those described herein is the implementation of a permissions policy, which is accomplished by applying an associative template that reflects the permissions desired for each matching (or nearly-matching) sub-tree in a HOUD. In this example, the permission policy to be applied to build directories contain certain common folder structures, where such a policy should also be inheritable to subdirectories (which may not be common across build directories).

In this example, this associative template forms a "set" of configuration settings (being directed to only permissions, in this example), with any archive analogous to a directory hierarchy in the filesystem having an equivalent root and set of subdirectories (subfolder trees).

The HOUD for this example (a directory tree) can be seen in FIG. 2, which will be discussed in more detail below.

A generic associative template for above HOUD can be defined using methods and systems such as those described herein. It will be noted that, in the present example, the main directory structure hierarchy is considered, while subdirectories are not, save for sub-trees that meet (at least to some extent) the structural requirements of the associative template's hierarchy structure. In this example, the desired attribute being configured is the permission setting for the given directory, such that when the given associative template is enforced on (applied to) a HOUD, such as that above, the desired permissions are configured.

The associative template is organized as per what is expected to be a typical instance of the given directory structure, based on the typical hierarchy encountered in such directory structures. (e.g., in this case, a build folder). Actual instances of any given directory structure may vary, and will often do so by some additional sub-folder specific to the case/instance.

Figure 3:
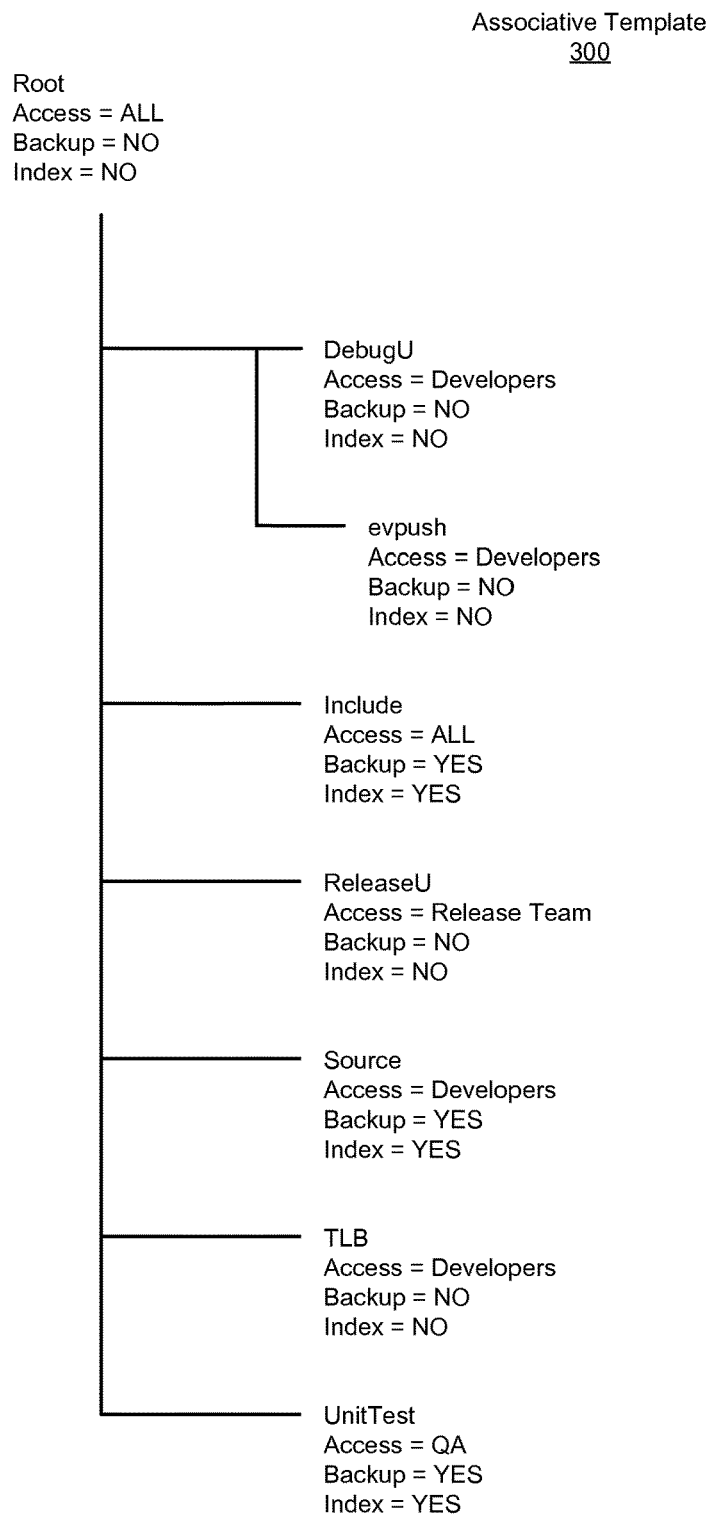
FIG. 3 is a simplified block diagram illustrating an example of an associative template, according to embodiments of methods and systems such as those disclosed herein.

For example, such an associative template can be defined as seen in FIG. 3, which will be discussed in more detail below.

As can be seen in this example, the associative template above can be applied to the root node (root directory) and at the "x64" node (directory), given the similarity between the associative template's structure and that of the sub-trees of the HOUD at the root node and "x64" node. As will be described in further detail subsequently, the root and "x64" nodes of the HOUD are referred to herein as template apply points.

Nodes in the associative template (associative template nodes) can be identified, for example, using nomenclature that is the same (or comparable) to that used to identify corresponding nodes in the corresponding HOUD hierarchy (HOUD nodes). Such identification can employ any suitable identifying information, such as name, alphanumeric values, or the like. Such identifiers can then be used to map associative template nodes to HOUD nodes, and thus create template associations.

An associative template, such as that presented above, thus specifically identifies each of its associative template nodes (individually, referred to herein as configuration elements), each of which carries a set of one or more parameter values (referred to herein as a configuration set) corresponding to the given associative template node (individually, referred to herein as a configuration element). Each such configuration set (each parameter of which is a set of configuration dimensions for the given configuration element, with each configuration element having some number of configuration dimensions) thus articulates the manner in which a corresponding node in the HOUD should have its configuration parameters set (where a configuration dimension is a configuration parameter that appears in one or more configuration elements (e.g., the access, backup, and index configuration parameters discussed subsequently, in connection with FIG. 3). The associative template can also include a special configuration set, referred to herein as a default configuration set, that maintains default parameter values. Such a default configuration set can be associated, for example, with the root of the associative template, or some other predefined location therein (or otherwise associated therewith). Such a default configuration set can be used, for example, to configure HOUD nodes within the HOUD hierarchy to which the associative template is applied, when no template association or inheritance can otherwise be determined. Further, multiple such default configuration sets (each with its own default parameter values) can be employed, and selected based on one or more criteria (e.g., having to do with a characteristic of a given HOUD node having no other association, characteristics of the HOUD, temporal information, and/or other such criteria).

In addition to the aforementioned features and advantages, an associative template according to embodiments of methods and systems such as those described herein also provide features and advantages having to do with the dynamic association of such an associative template and its corresponding HOUD organization. For example, an associative template can be associated to or disassociated from a HOUD node at any time, and evaluation of the configuration settings from the corresponding associative template node can be performed dynamically, as such associations change. In certain cases, a configuration setting from an associative template can allow certain operations on the corresponding HOUD node, causing one or more permanent changes. Later, the template association for that HOUD node may change, although the changes can be made to remain on that HOUD node. For auditing and compliance purposes, such changes can be tracked separately. Associative templates themselves do not track history or trending information except any version information maintained and updated after changes in the associative template itself.

Other such advantageous features will be apparent in light of the present disclosure and include, for example:
 The ability to apply a common associative template over trees/sub-trees that vary, whether from the associative template and/or one another;
 The application of an associative template over any designated node as a root for the template;
 The ability to provide flexible inheritance options in addition to natural parent-child relationships in template mapping
 Multiple sets of parameters combined/bundled together in a template, while allowing different inheritance settings independent to other set of settings.
 Allowing nesting of templates via letting choose child node of the template applied tree as another root for same or different template application.
 Modifications in template automatically reflect over template applied trees, making it very efficient for large set of items within trees.

Thus, in light of the present disclosure, numerous advantageous characteristics of associative templates will be apparent. Such advantages include the flexible definition of sub-trees provided by associative templates, which, for example, allow such associative templates to be applied to HOUD sub-trees, despite variances between the given associative template and the given HOUD sub-tree, while still following a given basic structure. Further, minimal-to-no overhead is associated with the association to, disassociation from, and alteration of associative templates, with respect to accessing/updating instances to which the associative template is applied. This provides a powerful mechanism for managing large numbers of settings, over large amounts of unstructured data. Further still, associative templates allow for the definition of diverse and complex configuration settings, while maintaining consistency and predictability in the management of such configuration settings. In general, then, the notion of a single associative template applicable to multiple instances of a matching sub-tree (at a template apply point, e.g.), thereby allowing a partial tree structure to be applied to actual instances, coupled with flexible inheritance (e.g., continuing, breaking, or overriding application), provides and effective, efficient mechanism for performing configuration management off unstructured data.

Example Enterprise Architecture

FIG. 1 is a simplified block diagram illustrating an example of an enterprise architecture, according to embodiments of methods and systems such as those disclosed herein. To that end, FIG. 1 depicts an enterprise architecture 100 that includes a system administration server 110 (supporting a configuration management system (CMS) 112), which is coupled to a local storage device 115 in which an associative template (AT) 117 is stored. Coupled to system administration server 110 are a number of clients (depicted in FIG. 1 as clients 120(1)-(N)), via a network 130. Clients 120(1)-(N) are also coupled, via network 130, to a storage system controller 140. Storage system controller 140 provides clients 120(1)-(N) with access to networked data storage, for example, by way of providing access to a number of storage devices (depicted in FIG. 1 as storages devices 150(1)-(N)). As can be seen in FIG. 1, data stored by storage system controller 140 on storage devices 150(1)-(N) on behalf of clients 120(1)-(N) can be stored in a hierarchical fashion, as is depicted by the structure of hierarchically-organized unstructured data (HOUD) 155.

As noted earlier, unstructured data such as HOUD 155 can include all manner of file types, formats, file-based device support, links, and other such storage entities, which can (and typically do) constantly change. In such environments, the unstructured data stored throughout structures such as HOUD 155 need to be managed with regard to user permissions, retention policies, backup schedules, and other such configuration management functions. To this end, as an example, a backup server 160 is coupled to network 130, and includes a backup management system (BMS) 165. Backup server 160 is also coupled to one or more storage devices (depicted in FIG. 1 as a storage device 170). In order to protect the data of users stored by storage system controller 140 on storage devices 150(1)-(N), backup management system 165 backs-up such data (e.g., HOUD 155) to storage device 170.

As noted elsewhere herein, and as will be apparent from FIG. 1, as the structure and extent of HOUD 155, as an example, becomes greater in both complexity and extent, the task of indicating to backup management system 155 which data items stored in HOUD 155 should be backed up and when such backups should occur also increases in its complexity and extent. Thus, a system administrator can look to a configuration management system such as configuration management system 112 to facilitate the configuration of structures such as HOUD 155 as per the rules and policies in effect at the given time. To accomplish this goal, configuration management system 112 employs an associative template such as associative template 117, by which configuration management system 112 can manage, update, and perform other operations with respect to the configuration sets of HOUD 155. As can be seen in FIG. 1 (and as will be apparent in subsequent Figures), because the structure and contents of HOUD 155 can vary from a uniformly defined structure (e.g., due to the fact that the users of clients 120(1)-(N) typically enjoy relatively unfettered access to their own directories in HOUD 155, and will, typically, make constant changes thereto), it will be appreciated that the structure of associative template 117, even if starting with a structure comparable to that of HOUD 155, will typically fail to match the structure of HOUD 155 exactly, over time. Thus, not only is it necessary to employ an associative template such as associative template 117 to configure the elements of HOUD 155, but also to effect mechanisms that facilitate application of associative template 117 to HOUD 155 that are able to account for such discrepancies and configure the structures in question appropriately.

Figure 2:
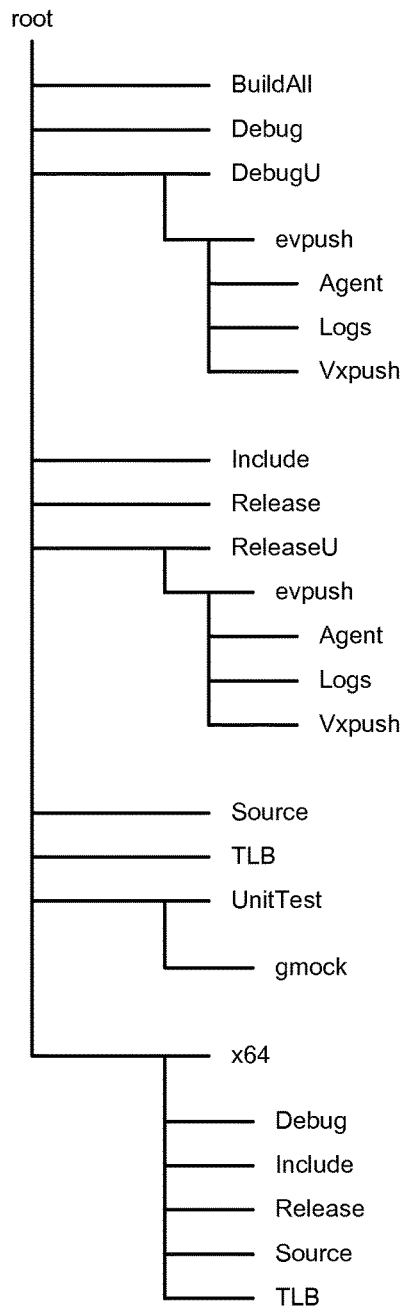
FIG. 2 is a simplified block diagram illustrating an example of hierarchically-organized unstructured data, according to embodiments of methods and systems such as those disclosed herein.

FIG. 2 is a simplified block diagram illustrating an example of hierarchically-organized unstructured data, according to embodiments of methods and systems such as those disclosed herein. FIG. 2 illustrates the structure of a hierarchically-organized unstructured data structure (depicted in FIG. 2 as target hierarchically-organized unstructured data 200. As noted earlier, target HOUD 200 has a hierarchical structure, in the form of a tree (in the manner noted earlier). Target HOUD 200, in this example, has at its highest level a root node and child nodes as depicted in FIG. 2 (and, as will be appreciated, in the manner of the foregoing example). In this example, three distinct policies are to be enforced (permissions policy, backup policy, and search indexing policy). These policies are applied to build directories containing certain common folder structures. In the example, these policies are also inheritable by sub-directories that may not be common across build directories. These configuration parameters form three sets of configuration settings, and can be applied to any archive that is analogous to a folder hierarchy in the filesystem having a root directory and comparable set of subdirectories. As will be appreciated in light of the present disclosure, policies related to one or more retention plans can also be included in the given configuration set, as yet another configuration dimension.

FIG. 3 is a simplified block diagram illustrating an example of an associative template, according to embodiments of methods and systems such as those disclosed herein. FIG. 3 depicts an associative template 300 that is structured, to a general extent the structure of target HOUD 200, and includes examples of various configuration sets. These configuration sets (e.g., including access permissions, backup directives, and search index directives, but which can also include retention policy and other such configuration parameters) demonstrates the manner in which associative template 300 can facilitate the management of such configuration sets for, in this example, hierarchically organized structures (e.g., such and the file system directory structures discussed earlier).

Nodes in the associative template (associative template nodes) can be identified, for example, using nomenclature that is the same (or comparable) to that used to identify corresponding nodes in the corresponding HOUD hierarchy (HOUD nodes). Such identification can be by any suitable identifying information, such as name, alphanumeric values, or the like. Such identifiers can then be used to map associative template nodes to HOUD nodes, and thus create template associations. The associative template identifies specific associative template nodes, each of the associative template nodes thus identified carries a set of one or more parameter values corresponding to the configuration element.

Thus, using a location within a hierarchical structure of a HOUD (e.g., the root node of target HOUD 200), the application of associative template 300 can greatly simplify the configuration management of configuration sets by allowing each dimension of a configuration set of a given node (e.g., directory) to be configured by matching (or attempting to match) a node in associative template 300 and a node in target HOUD 200, and applying the resulting configuration parameter values in the applicable configuration set (or an appropriate configuration set thus determined). Such configuration parameters are also referred to herein as attributes, and are set to a particular value (also referred to herein as parameter values).

The associative template can also include a special set of configuration elements as a default configuration set. Such a default configuration set can be associated, for example, with the root of the associative template, or some other predefined location therein (or otherwise associated therewith). Such a default configuration set can be used, for example, to represent HOUD nodes within the HOUD hierarchy to which the associative template is applied.

In the present example, associative template 300 has a hierarchical organization corresponding to that of several of the sub-trees of target HOUD 200. To enforce the configuration settings defined in associative template 300 at the applicable point in HOUD 200, a template apply point is identified in HOUD 200, and the root node of associative template 300 is associated to that node. From this point, the configuration settings defined in associative template 300 can be applied to the corresponding nodes (directories) in HOUD 200, subject to any inheritance rules and other mechanisms applicable to the given HOUD node.

Example Processes for Configuring Unstructured Data

Figure 4:
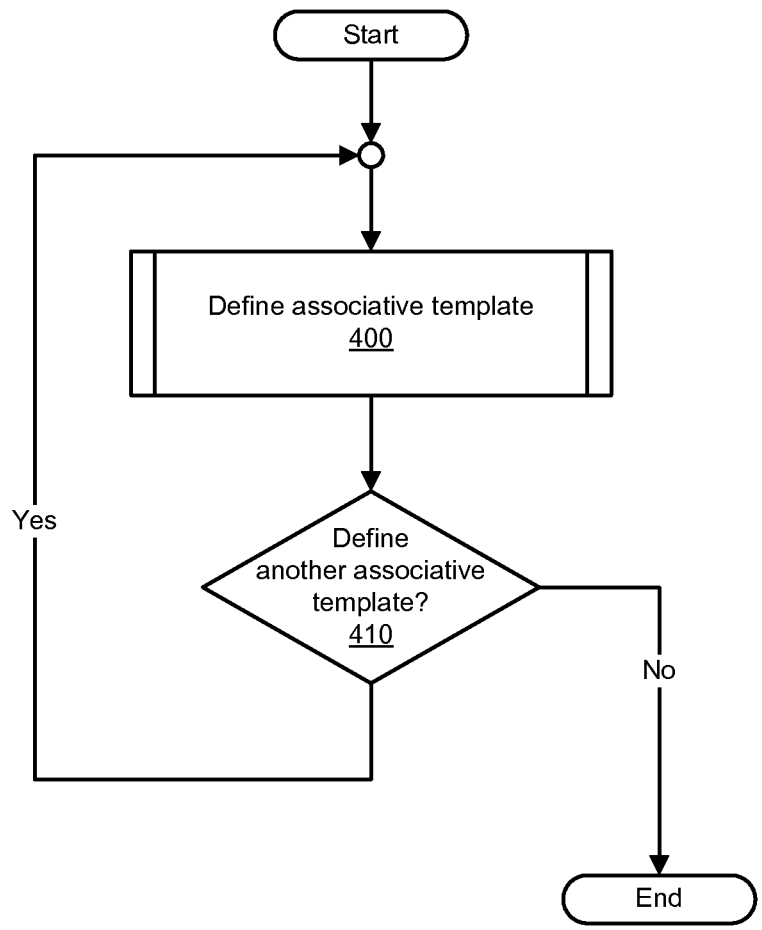
FIG. 4 is a simplified flow diagram depicting a process for defining one or more associative templates, according to embodiments of methods and systems such as those disclosed herein.

FIG. 4 is a simplified flow diagram depicting a process for defining one or more associative templates, according to embodiments of methods and systems such as those disclosed herein. The flow diagram FIG. 4 illustrates a simple example of the definition of one or more associative templates, such as associative template 300 of FIG. 3. The process of FIG. 4 includes the definition of an associative template (400) and decision as to whether further associative templates are to be defined (410). Once the requisite associative templates are defined, the process concludes.

Figure 5:
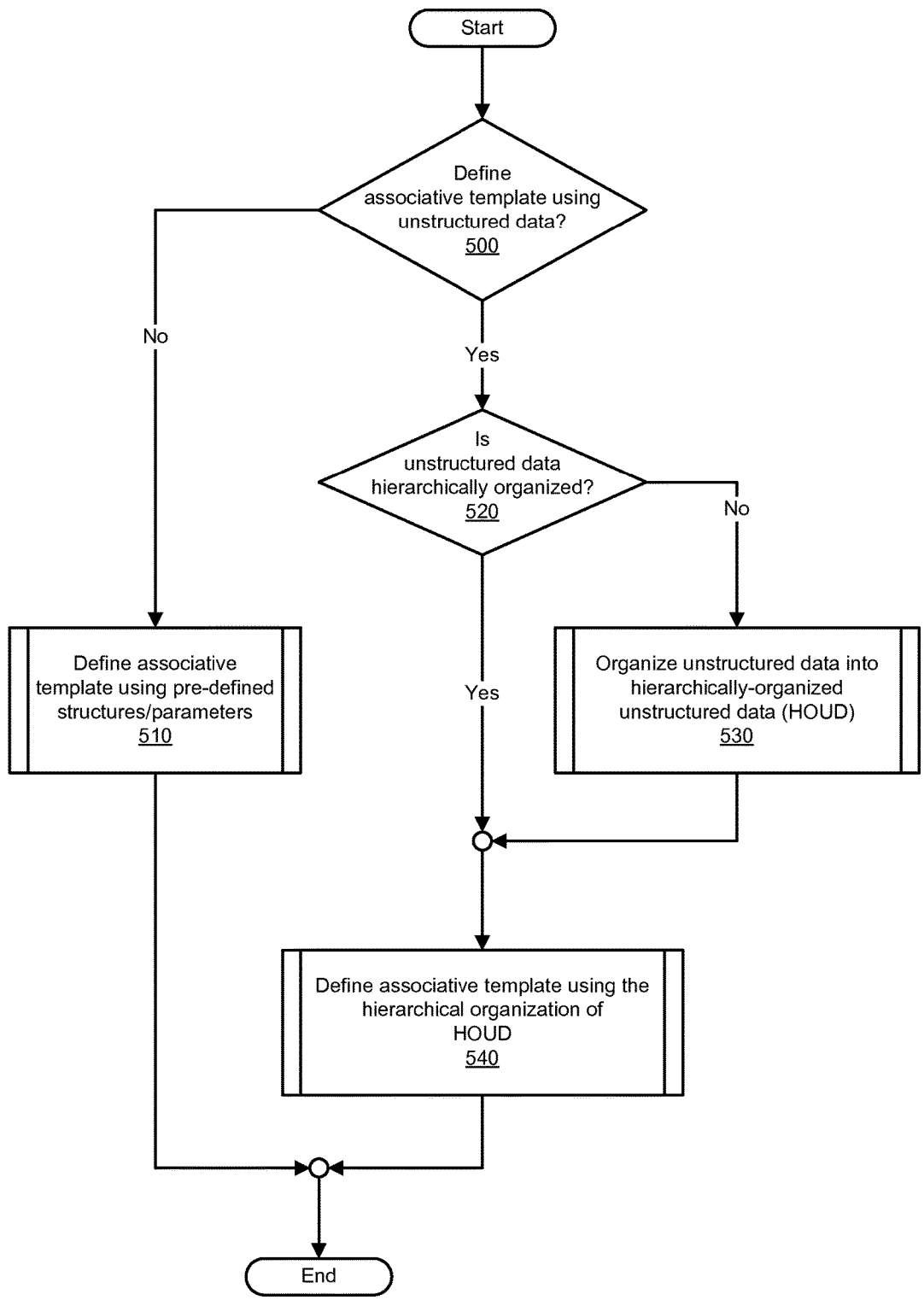
FIG. 5 is a simplified flow diagram depicting a more detailed process for defining an associative template, according to embodiments of methods and systems such as those disclosed herein.

FIG. 5 is a simplified flow diagram depicting a more detailed process for defining an associative template, according to embodiments of methods and systems such as those disclosed herein. That being the case, FIG. 5 depicts an example of a process that can be performed to defined an associative template. The process of FIG. 5 begins with a determination as to the basis for defining the associative template, and thus determine whether the associated template will be defined using the structure of the unstructured data (500). If the associative template's structure is not defined using the unstructured data (500), the process assumes that pre-defined structures and/or parameters will be used in defining the associative template, thus, a process for defining the associative template using pre-defined structures and/or parameters is performed (510). An example process for defining the associative template using pre-defined structures and/or parameters is discussed in connection with FIG. 6, below. Once the associative template is thus defined, the process concludes.

However, if the unstructured data is to be used in defining the associative template's structure (500), the associative template's structure can be configured by determining the organization of the unstructured data and extrapolating a generic structure therefrom. This process begins with a determination of whether the unstructured data is already hierarchically organized (520). If the unstructured data is not already hierarchically organized (520), a process is performed to organize the unstructured data into a hierarchical organization (thus organizing the unstructured data into hierarchically-organized unstructured data (HOUD) (530). An example process for organizing unstructured data into hierarchically-organized unstructured data is discussed in connection with FIG. 7, below. If the unstructured data is already hierarchically organized (or once the unstructured data has been hierarchically organized), the organization of the associative template can be defined using the hierarchical organization of the HOUD (540). An example process for defining the associative template's organization using the hierarchical organization of the HOUD is discussed in connection with FIG. 8, below.

Figure 6:
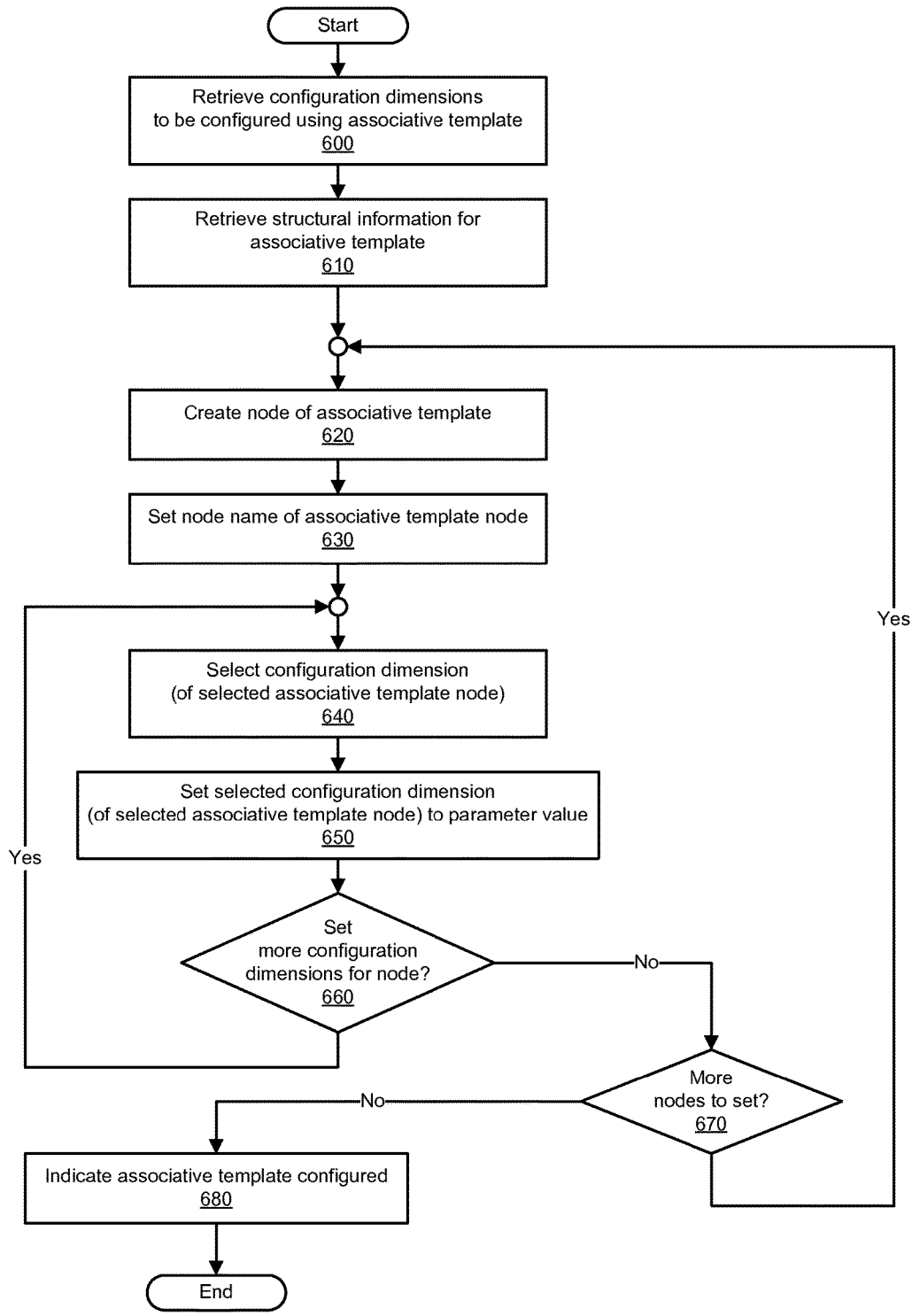
FIG. 6 is a simplified flow diagram depicting a process for defining an associative template using pre-defined structures and parameters, according to embodiments of methods and systems such as those disclosed herein.

FIG. 6 is a simplified flow diagram depicting a process for defining an associative template using pre-defined structures and parameters, according to embodiments of methods and systems such as those disclosed herein. As noted with regard to element 510 of FIG. 5, an associative template can be defined using pre-defined structures and/or parameters. The process depicted in FIG. 6 is an example of such a definition process. The process of FIG. 6 thus begins with the retrieval of configuration dimensions (configuration set parameter values) to be configured using the associative template (600). At this point, structural information to be used in organizing the structure of the associative template is also retrieved (610). The process for creating nodes within the associative template then proceeds. A node of the associative template is create (620), the first such node typically being the associative template's root node. Subsequently, child nodes of the root node, and child nodes of those nodes, and so on are created. Once the node in question is created (620), the associative template node's node name is set (630). The configuration set for the associative template node is then configured. To this end, a configuration dimension within the configuration set for the selected associative template node is selected (640). The selected configuration dimension is then set to the appropriate parameter value, as indicated in the configuration set's configuration dimensions (650).

A determination is then made as to whether further configuration dimensions for the selected associative template node need to be set (660). If further configuration dimensions require configuration, the process loops and the next associative template node is selected (640) and its next configuration dimension set (650). This process continues until all the requisite configuration dimensions for the selected associative template node have been set. Once this occurs, the process proceeds to a determination as to whether further associative template nodes need to be created (620) and their various characteristics configured (630, 640, 650, 660) (670). Once the associative template's nodes have been created and configured (670), an indication is made as to the associative template's having been successfully configured (680). The process then concludes.

Figure 7:
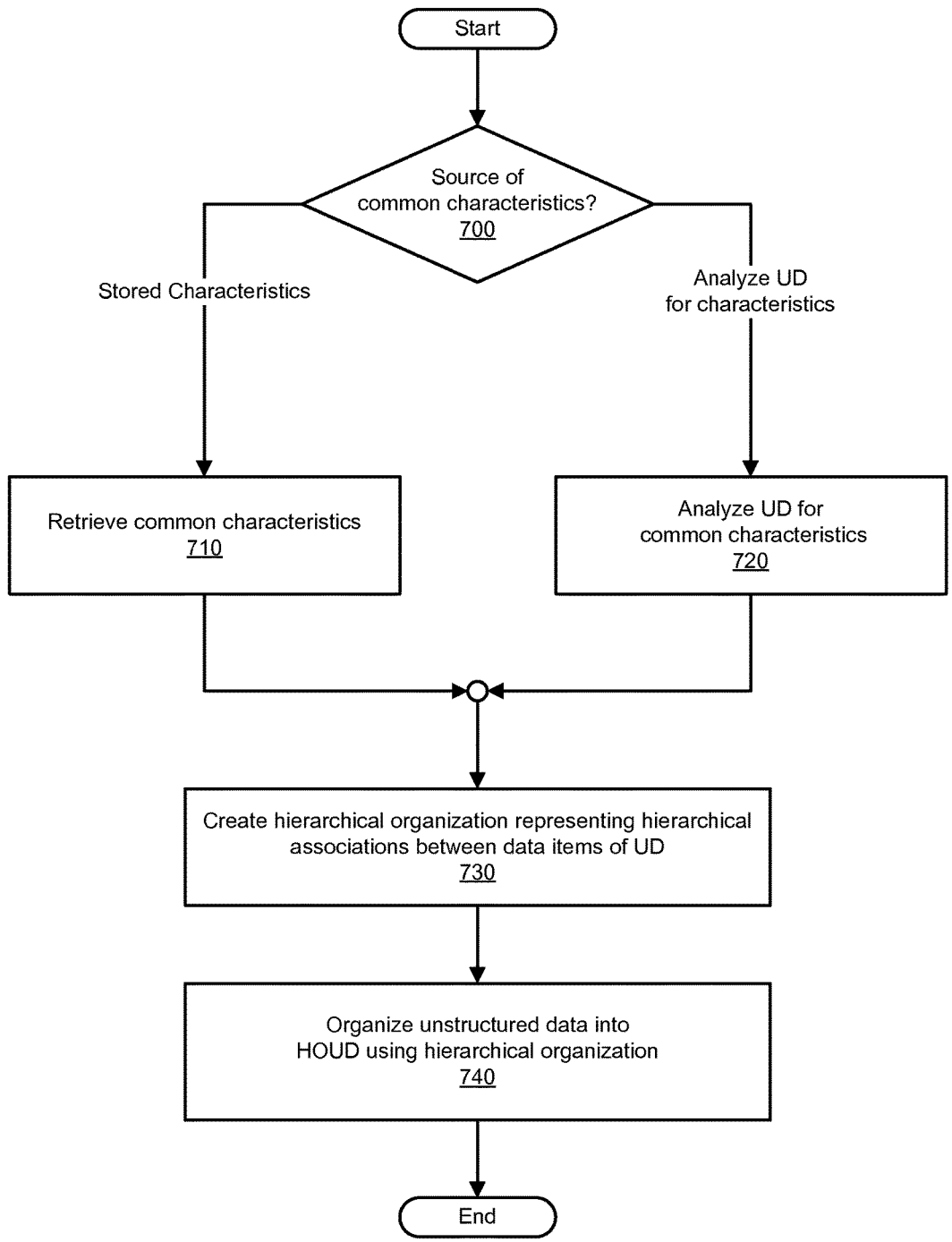
FIG. 7 is a simplified flow diagram depicting a process for organizing unstructured data into hierarchically-organized unstructured data, according to embodiments of methods and systems such as those disclosed herein.

FIG. 7 is a simplified flow diagram depicting a process for organizing unstructured data into hierarchically-organized unstructured data (HOUD), according to embodiments of methods and systems such as those disclosed herein. FIG. 7 depicts an example process for the organization of unstructured data into a hierarchical organization, such that the resulting hierarchically-organized unstructured data and its structure can be used by other processes discussed herein. For example, the structure of such an HOUD can be used, as noted, in the definition of one or more applicable associative templates. Thus, the associative template thus defined might be structured based on the hierarchical organization starting at the top of the hierarchical structure, or may be defined based on a hierarchical structure within the hierarchical organization (e.g., a sub-tree therein).

Before such an organization can be defined, a determination is made as to the one or more criteria to be used in creating such a structure. To that end, a determination is made as to the source of the unstructured data's common characteristics (700). As will be appreciated, a common characteristic among unstructured data can be based on any number of characteristics and can include pre-defined characteristics (e.g., ownership, descriptive characteristics, file type, size, contents, and/or other characteristics, taken alone or in any appropriate combination) or common characteristics culled from the unstructured data itself. In the former case, the process depicted in FIG. 7 retrieves the requisite common characteristics from storage (710). In the latter case, the unstructured data is analyzed for one or more common characteristics, as may become apparent as between the data items of the unstructured data when analyzed (720).

In any event, once the requisite common characteristics have been determined, a hierarchical organization representing any hierarchical associations between data items of the unstructured data having been determined, is created (730). The unstructured data now having a hierarchical organization (730), the unstructured data can thus be organized using this hierarchy (or other such structure, as noted) and treated as being hierarchically organized (and so as HOUD), using this hierarchical organization (740).

Figure 8:
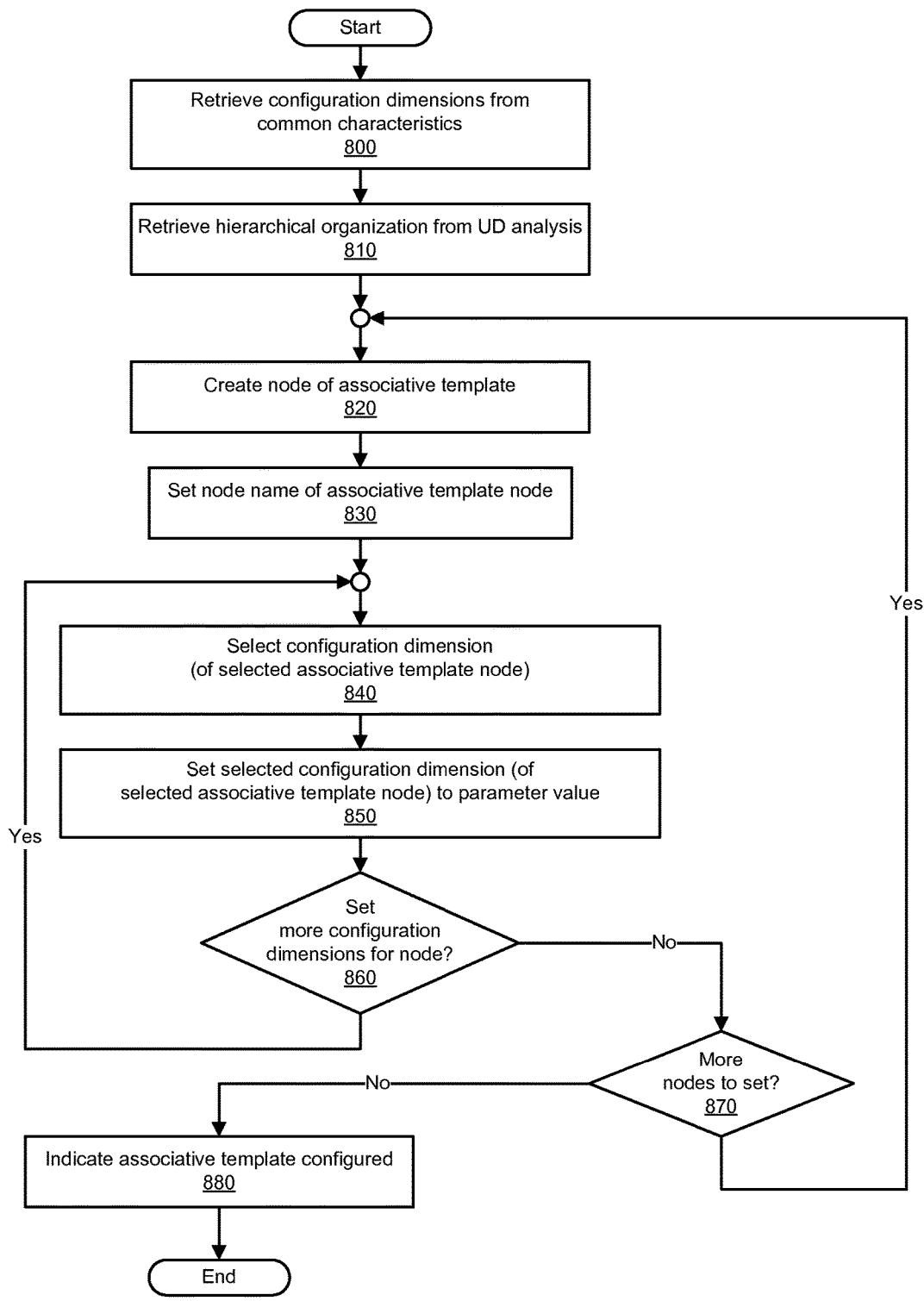
FIG. 8 is a simplified flow diagram depicting a process for defining an associative template using the structure of hierarchically-organized unstructured data, according to embodiments of methods and systems such as those disclosed herein.

FIG. 8 is a simplified flow diagram depicting a process for defining an associative template using the structure of hierarchically-organized unstructured data, according to embodiments of methods and systems such as those disclosed herein. As noted with regard to element 540 of FIG. 5, an associative template can be defined using the hierarchical organization of the HOUD to which the associative template is to be applied. That being the case, the process of FIG. 8 defines the associative template in question using the hierarchical organization of an HOUD (or, more typically, a sub-portion (e.g., a sub-tree) thereof). This process begins with the retrieval of configuration dimensions from the common characteristics determined from the analysis of the unstructured data (800). At this juncture, the hierarchical organization that was determined from the analysis of the unstructured data is also retrieved (810).

In a manner similar to that of the process depicted in FIG. 6, each node of the associative template must be created and configured. That being the case, a given one of the associative template nodes is created (820) and its node name set (830). As noted elsewhere herein, a node name or other identifier can be used to determine a template association (i.e., correspondence between) an associative template node and a node in the hierarchy of the HOUD. As before, a configuration dimension, as defined in the given configuration set, is selected for the selected associative template node (840). The selected configuration dimension for the selected associative template node is then set to the appropriate parameter value (850). A determination is then made as to whether additional configuration dimensions need to be set for the given associative template node (860). Once the requisite configuration dimensions have been set for the associative template node, a determination is made as to whether further associative template nodes need to be created, and their configuration dimensions set (870). If additional associative template nodes remain to be created and configured, the process loops and performs the necessary operations. Once the requisite associative template nodes have been created and configured, an indication is made as to the successful creation and configuration of the associative template (880), and the process concludes.

Figure 9:
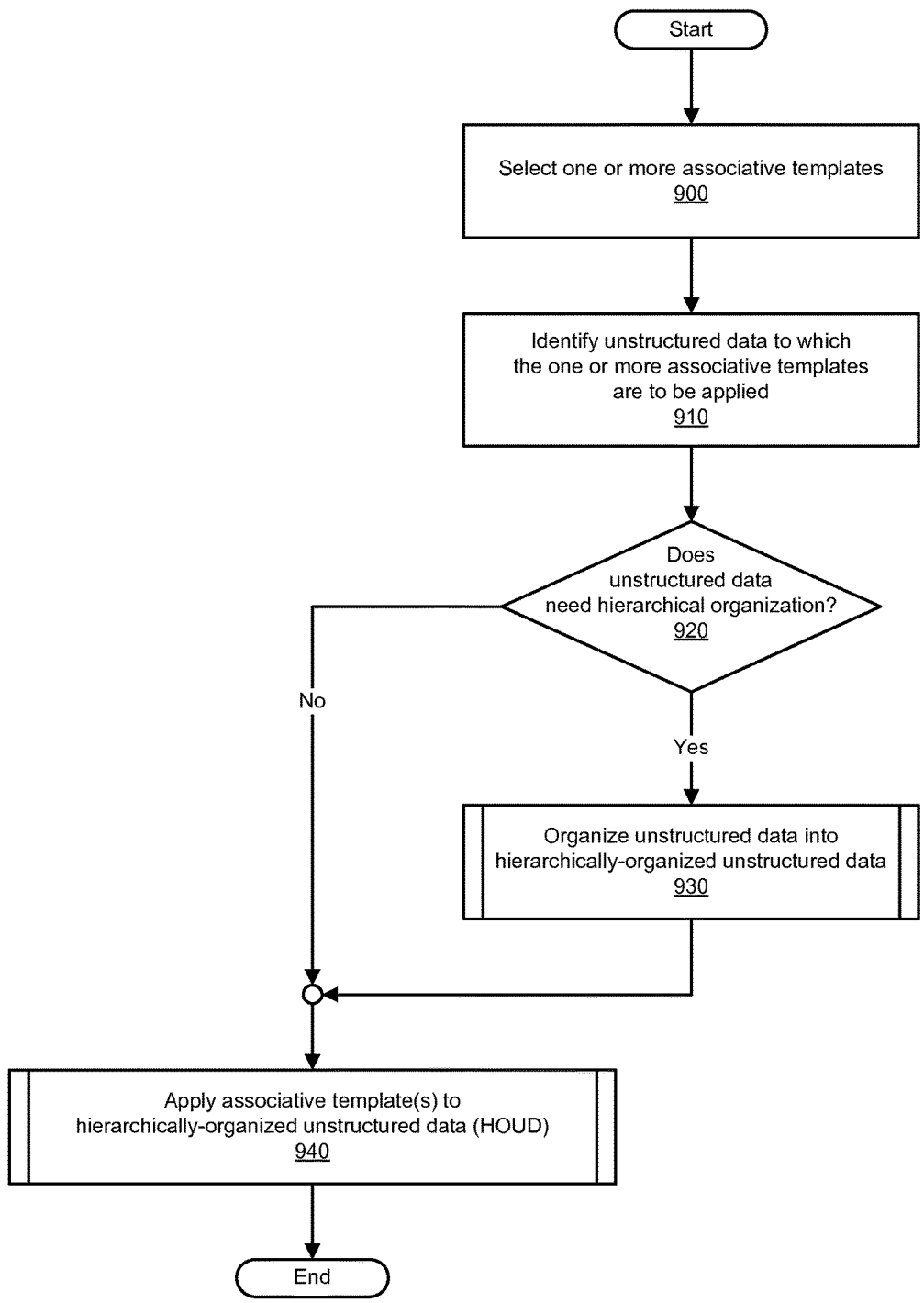
FIG. 9 is a simplified flow diagram depicting an overall process for applying an associative template to hierarchically-organized unstructured data, according to embodiments of methods and systems such as those disclosed herein.

FIG. 9 is a simplified flow diagram depicting an overall process for applying an associative template to hierarchically-organized unstructured data, according to embodiments of methods and systems such as those disclosed herein. The process of FIG. 9 is an example of an overall process for applying one or more associative templates to hierarchically-organized unstructured data. The process of FIG. 9 begins with the selection of one or more associative templates to be applied to the given HOUD (900). Next, the unstructured data to which the one or more associative templates are to be applied is identified (910). A determination is then made as to whether the unstructured data is hierarchically organized, or such organization must be determined (920). If the unstructured data is in need of hierarchical organization, a process of organizing the unstructured data into hierarchically-organized unstructured data is performed (930). An example process for organizing unstructured data into hierarchically-organized unstructured data is discussed in connection with FIG. 7, above. If the unstructured data is already in some manner of hierarchical organization (or has been organized into hierarchically-organized unstructured data), the one or more associative templates are applied to the HOUD (940). An example process for the application of an associative template to a HOUD is discussed in connection with FIG. 10, below.

Figure 10:
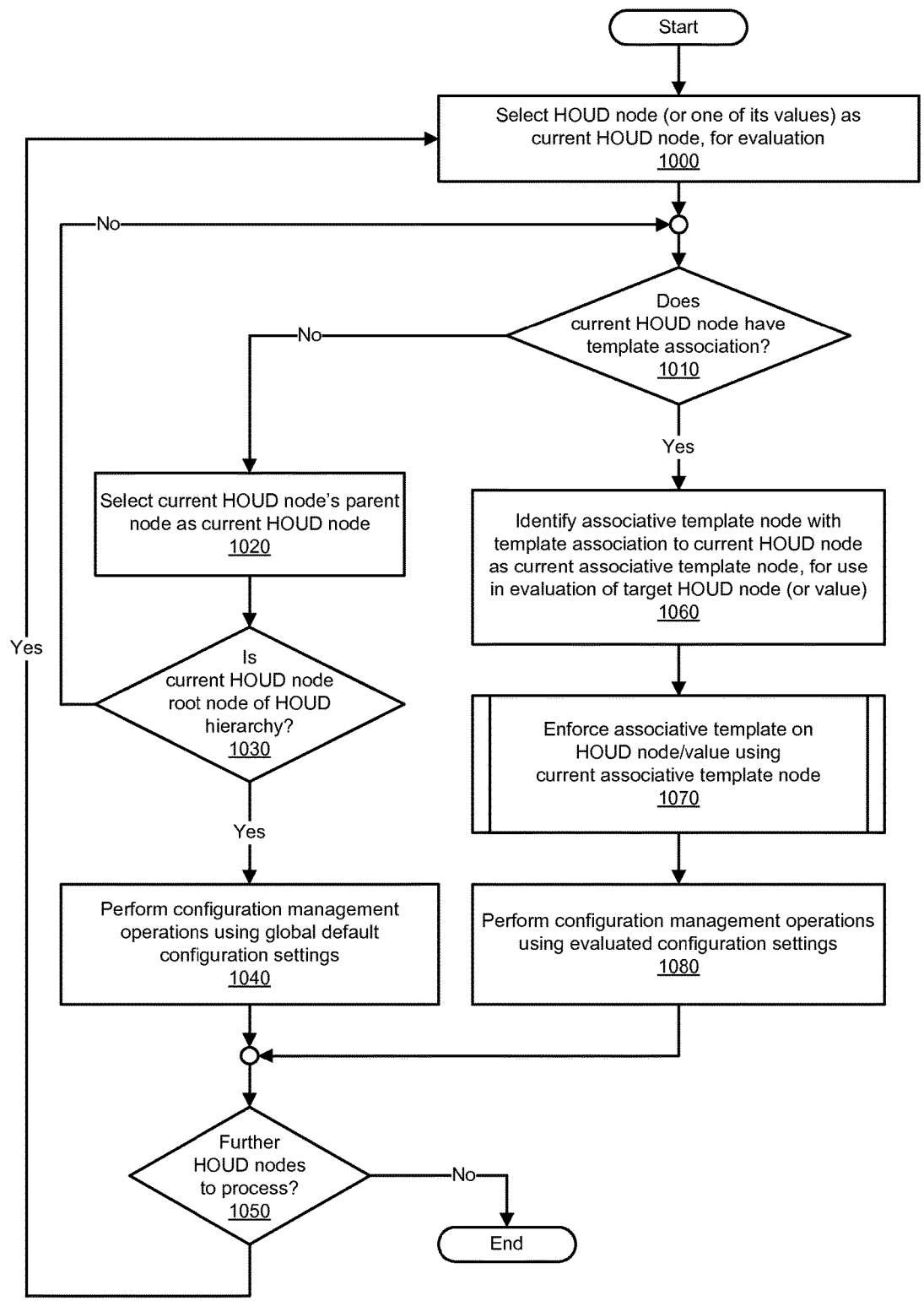
FIG. 10 is a simplified flow diagram depicting a process for evaluating configurations settings from an associative template, according to embodiments of methods and systems such as those disclosed herein.

FIG. 10 is a simplified flow diagram depicting a process for evaluating configurations settings from an associative template, according to embodiments of methods and systems such as those disclosed herein. FIG. 10 depicts an example of a process for evaluating configuration settings from an associative template with respect to an HOUD. The process of FIG. 10 begins with the selection of an HOUD node (or one of its values) as the current HOUD node (1000). It is this current HOUD node which will be evaluated with regard to the configuration settings in the associative template. Thus, the HOUD node or one of its values will be evaluated in light of the configuration settings from the associative template. The current HOUD node acts as a target node, and so the process of configuration begins at this point. Once the current HOUD node is identified, a determination is then made as to whether the current HOUD node has a template association with a node of the associative template (1010). The concept of template association, as noted, represents a situation in which the current HOUD node has a corresponding associative template node, thereby allowing for evaluation of the applicable configuration set(s) (and configuration dimensions thereof). If the current HOUD node does not have a template association (1010), in certain embodiments, the current HOUD node's parent node is selected as the current HOUD node (1020). In this fashion, a configuration set can be determined for the target node by traversing the HOUD structure towards its root node (and so, traversing the associative template towards its root node). In a tree structure, this has the salutary effect of allowing the use of a default configuration set upon traversal to the root node in the associative template.

As will be appreciated further, traversal of the graph structure of a given HOUD hierarchy can be accomplished in a number of ways, as by selecting another node in the HOUD hierarchy with some relationship to the current HOUD node, such as a sibling node of the current HOUD node. In such a scenario, an approach for determining that default configuration setting to be applied could include the situation in which no further sibling node remained, a certain number of nodes had been evaluated, or other such alternative. Further still, such traversals proceed downward in a given hierarchy with default configuration setting being applied upon encountering a leaf or, alternative, arriving at a certain depth or distance to a leaf.

Once the current HOUD node's parent node has been selected (or other traversal performed), a determination is made as to whether the now-current HOUD node is the root node of the HOUD hierarchy (1030). (Or, alternatively, whether the now-current HOUD node is one such that the default configuration settings should be used.) If the current HOUD node is not the root node of the HOUD hierarchy, the process proceeds to the aforementioned determination as to whether the current HOUD node has a template association (1010). However, if the current HOUD node is the root node of the HOUD hierarchy, this indicates that the target HOUD node (or its value) has no template association with an associative template node, and thus, one or more default configuration settings (e.g., a default configuration set) should be applied. In this case, configuration management operations are performed using global default configuration settings (1040). At this point, a determination is made as to whether additional HOUD nodes remain to be processed (1050). If further HOUD nodes remain to be processed (1050), the process sloops to the selection o the next HOUD node to be processed (1000). The process continues to iterate in this fashion until the requisite nodes have been processed. Once these nodes have been processed, the process concludes.

Alternatively, the current HOUD node may be found to have a template association (1010). If such is the case, the associative template node having a template association to the current HOUD node is identified as the current associative template node (1060). This current associative template node is then available for use in evaluation of the target HOUD node (or its value). Having identified the current associative template node and the target HOUD node (or value), a process for enforcing the associative template on the HOUD node/value using the current associative template node is performed (1070). An example process for enforcing the associative template on the HOUD node/value is discussed in connection with FIG. 11, below. These operations can include, for example, enforcing the template and extracting configuration settings for evaluation. As will be appreciated, the evaluated configuration settings can be used in performing actions or imposing policy decisions within one or more workflows, which are related to the management of HOUD configuration.

Once template enforcement has been performed, configuration management operation can be performed using the evaluated configuration settings that result (1080). Next, as before, a determination is made as to whether further HOUD nodes remain to be processed (1050). If further HOUD nodes remain to be processed, the process loops to the selection of the next HOUD node as the current HOUD node (1000), and the process iterates. Otherwise, the process concludes.

Figure 11:
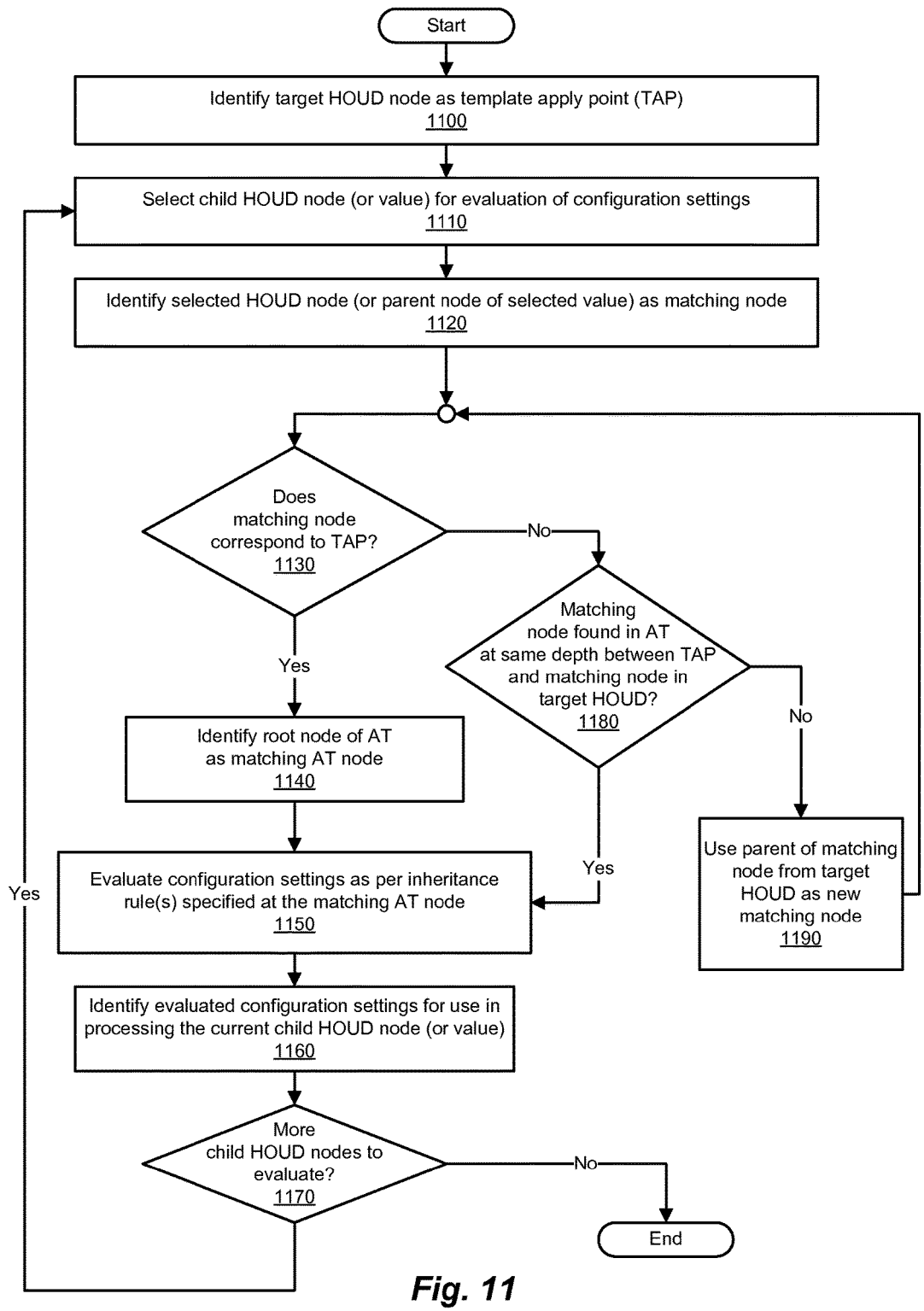
FIG. 11 is a simplified flow diagram depicting a process for enforcing an associative template, according to embodiments of methods and systems such as those disclosed herein.

FIG. 11 is a simplified flow diagram depicting a process for enforcing an associative template, according to embodiments of methods and systems such as those disclosed herein. FIG. 11 depicts a process for the enforcement of an associative template in configuring an HOUD. Such a template enforcement process begins with the identification of the target HOUD node as the template apply point (TAP) (1100). In applying the associative template to the target HOUD, a child HOUD node (or value) of the template apply point is selected for evaluation of configuration settings (1110). The selected HOUD node (or parent node selected value) is then identified as the matching node (1120). A determination is then made as to whether the matching node corresponds to the template apply point (1130). If the matching node corresponds to the TAP, the root node of the associative template is identified as the matching associative template node (1140). Configuration settings are then evaluated as per inheritance rule(s) specified at the matching associative template node (1150). Evaluated configuration settings are then identified for use in processing the current child HOUD node (or value) (1160). Such inheritance rules can be designed in light of application requirements, and can use options such as those now discussed. Inheritance rules can be devised using distinct or common configuration settings that are inherited by child nodes and values. Alternatively, the inheritance chain can be started, continued, or broken at the matching node level. Further still, separate or common rules for the number of configuration settings can also be made the subject of such inheritance rules. Once the evaluated configuration settings are identified, a determination is made as to whether further HOUD nodes remain to be evaluated (1170). If further HOUD nodes are to be evaluated, the process loops to the selection of the next child HOUD node (or value) (1110). Otherwise, the process concludes.

Returning to the determination as to whether the matching node corresponds to the TAP (1130), if such is not the case, (and thus no other parent node is found except for the TAP), a determination is made as to whether the current associative template node (matching node) found in the associative template is at the same depth between the TAP and matching node in the target HOUD (1180). If these nodes are not at the same depth, the parent node of the matching node in the target HOUD is used as the new matching node (1190). At this juncture, the process loops to the determination as to whether the matching node corresponds to the template apply point (1130). The process then continues to iterate.

Alternatively, if the matching node found in the associative template is of the same depth as the matching node in the target HOUD with respect to the template apply point, the process evaluates configuration settings as per the aforementioned inheritance rule(s) specified at the matching associative template node (1150). As before, the evaluated configuration settings are identified for use in processing the current child node (or value) (1160), with the application of inheritance rules in the manner noted previously. Once again, a determination is made as to whether additional child HOUD nodes remain to be evaluated (1170). As before, the process iterates until no further child HOUD nodes remain to be evaluated. At this juncture, the process concludes.

Thus, in applying an associative template to a sub-tree in a HOUD hierarchy, various operations are performed. When an associative template is applied to a sub-tree of a HOUD hierarchy, the configuration set associated to the actual node in the given HOUD hierarchy sub-tree is applied. When the configuration management system uses the associative template to evaluate the configuration settings of a given node of the HOUD hierarchy, the configuration management system refers to the associative template being applied, in order to find the set of configuration settings.

The configuration management system can accomplish this using logic such as the following:

If the given HOUD node has direct representation in the associative template, the configuration manager uses configuration settings from the associative template node that is associated (by template association) with that HOUD node If the parent (HOUD) node of the given HOUD node is represented in the associative template, the configuration manager uses inheritance logic defined within the associative template (e.g., logic that can be used to determine whether/how configuration settings might be inherited by the given HOUD node from its parent node (or rather, the parent node's corresponding associative template node)) to determine the appropriate configuration settings to use. This process of referring to a given HOUD node's parent node can be effected in a recursive manner, and can proceed in this fashion until, for example, the configuration manager identifies a (parent) HOUD node with a corresponding associative template node (i.e., a (parent) HOUD node with a template association to such associative template node), or the configuration manager's process of examining HOUD nodes in this fashion results in reaching the root node of the associative template. In latter case, the associative template default settings are used.

In cases in which the configuration settings called out in an associative template are recursively applied to the HOUD, a given HOUD node can be represented in multiple associative templates that might be applicable to that HOUD node (as well as to any of its parent nodes in the HOUD hierarchy). In such cases, the associative template closest to the given HOUD node (e.g., from a graph theory perspective) is considered overriding.

Further, other features can be supported by an associative template according to embodiments of methods and systems such as those described herein. Such features can include:

As per the specification of such policies in the associative template in question, each associative template node can also include information that defines inheritance rules for its children. Such inheritance rules can be subject to various conditions, and can be specific to a given configuration element or multiple configuration elements within a configuration set. Conditions to which such inheritance rules can be subject can include, for example:

Children directly inheriting from the given associative template node

Configuration settings being exclusively for the specified node, with children carrying the default configuration settings of the associative template Configuration settings being exclusively for the specified associative template node, with no configuration settings defined for children of the given associative template node Two distinct configuration sets, one configuration set for the specified associative template node, and another configuration set that is inherited by the children of the specified associative template node An associative template can have multiple nodes that carry the same identifiers (e.g., names), although typically, such identifiers are used to distinguish different sets of children (carrying different configuration settings) from one another. Upon applying such an associative template to a given HOUD hierarchy sub-tree, such multiple instances of associative template nodes would be associated to the same node in the given HOUD hierarchy. Common children are not allowed in multiple instances within an associative template, and such potential conflicts can be resolved using one of the following options, for example:

- Allow only one instance of associative template node to represent unspecified children, and such an associative template node should be specifically identified.
- Resolve any conflict between associative template nodes based on a set priority or order of occurrence (last associative template node encountered overrides any other associative template nodes encountered earlier, first associative template node encountered defines the settings in question (and cannot be overridden by other instances)
- All unspecified (within template) nodes in organization carry default set of configuration settings.

Figure 12:
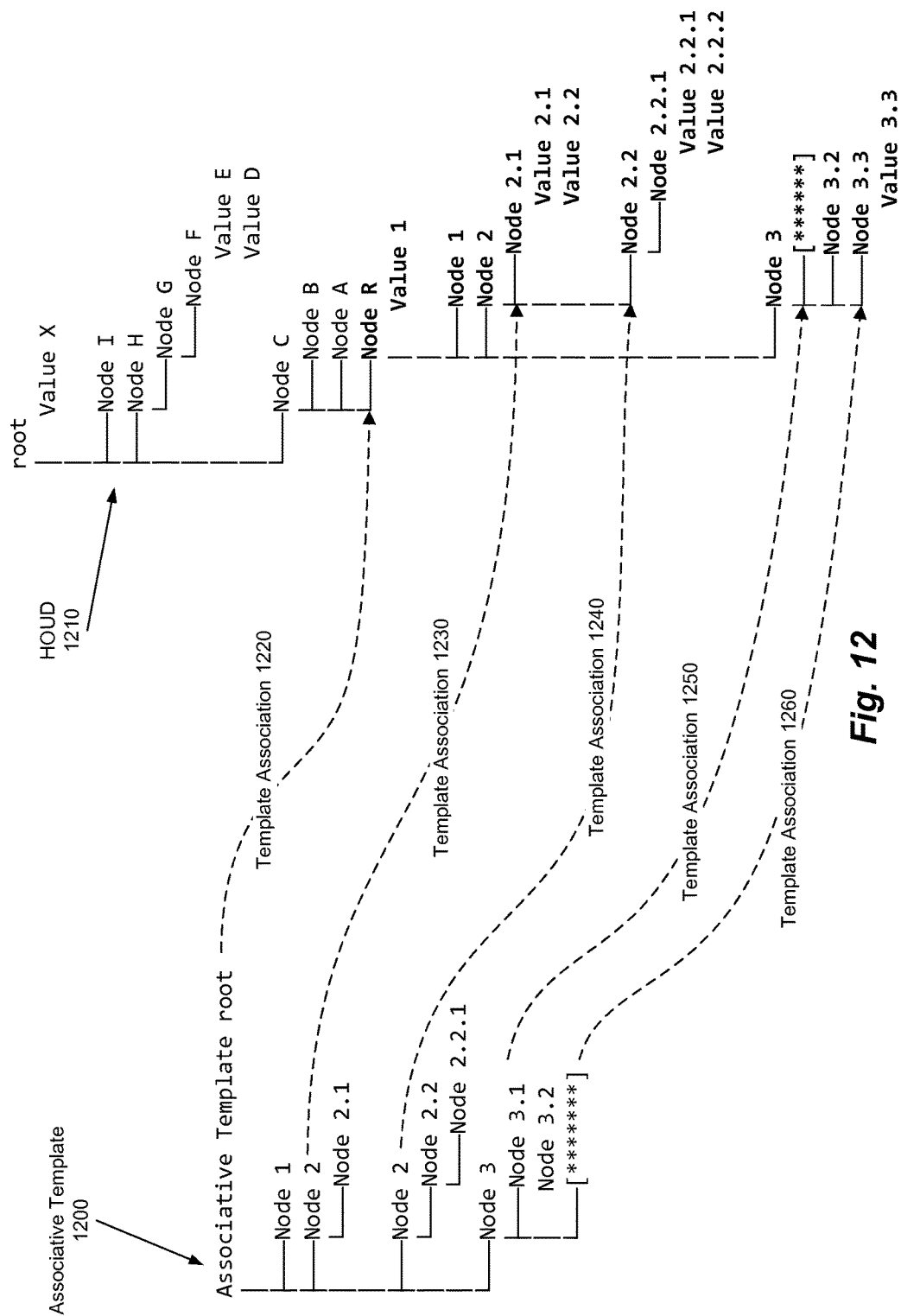
FIG. 12 is a simplified block diagram illustrating an example of an associative template's association to the hierarchical structure of hierarchically-organized unstructured data, according to embodiments of methods and systems such as those disclosed herein.

FIG. 12 is a simplified block diagram illustrating an example of an associative template's association to the hierarchical structure of hierarchically-organized unstructured data, according to embodiments of methods and systems such as those disclosed herein. The associative template and HOUD depicted in FIG. 12 (depicted, respectively, as associative template 1200 and HOUD 1210) provide examples of template associations therebetween, as well as examples of their respective hierarchies. Associative template 1200 maintains default configuration settings at the associative template root, in a manner such as that described previously. Each node in the associative template has one or multiple sets of configuration settings, as well as information regarding inheritance policies and rules to be employed in the application of that associative template node and/or other such nodes therein. In the example depicted in FIG. 12, Node 2.1 and Node 2.2 of associative template 1200 can, optionally, have their own configuration settings within a single instance of parent Node 2.

As noted, a number of template associations exist between the nodes of associative template 1200 and those of HOUD 1210. Such template associations include template associations 1220, 1230, 1240, 1250, and 1260. Template association 1220 is a template association of associative template root node to the corresponding node in target HOUD (Node R). In this example, this sets the template apply point as Node R. Template association 1230 is a template association in the first instance of Node 2 in associative template 1200 that refers to child Node 2.1, while template association 1240 is a template association of the second instance of Node 2 in associative template that refers to child Node 2.2. As can be seen in FIG. 12, template association 1250 is a template association that represents a missing node in HOUD 1210, while template association 1260 is a template association that represents a missing node in associative template 1200.

Given the foregoing template associations, the following will result from the application of associative template 1200 to HOUD 1210. Value 1 in HOUD 1210 will inherit configuration settings from the associative template root (which maintains the default configuration parameters in associative template 1200). Node 1 and its children nodes/values carry configuration settings as indicated for Node 1 of associative template 1200. Node 3.1 in associative template 1200 is either ignored, or a corresponding node created in HOUD 1210, upon template association as per the relevant and applicable policy. Conversely, Node 3.3 is missing in associative template 1200, and so Node 3.3 will inherit the configuration settings of Node 3 in associative template 1200, as per the set inheritance rules (the same applies to Value 3.3).

Figure 13:
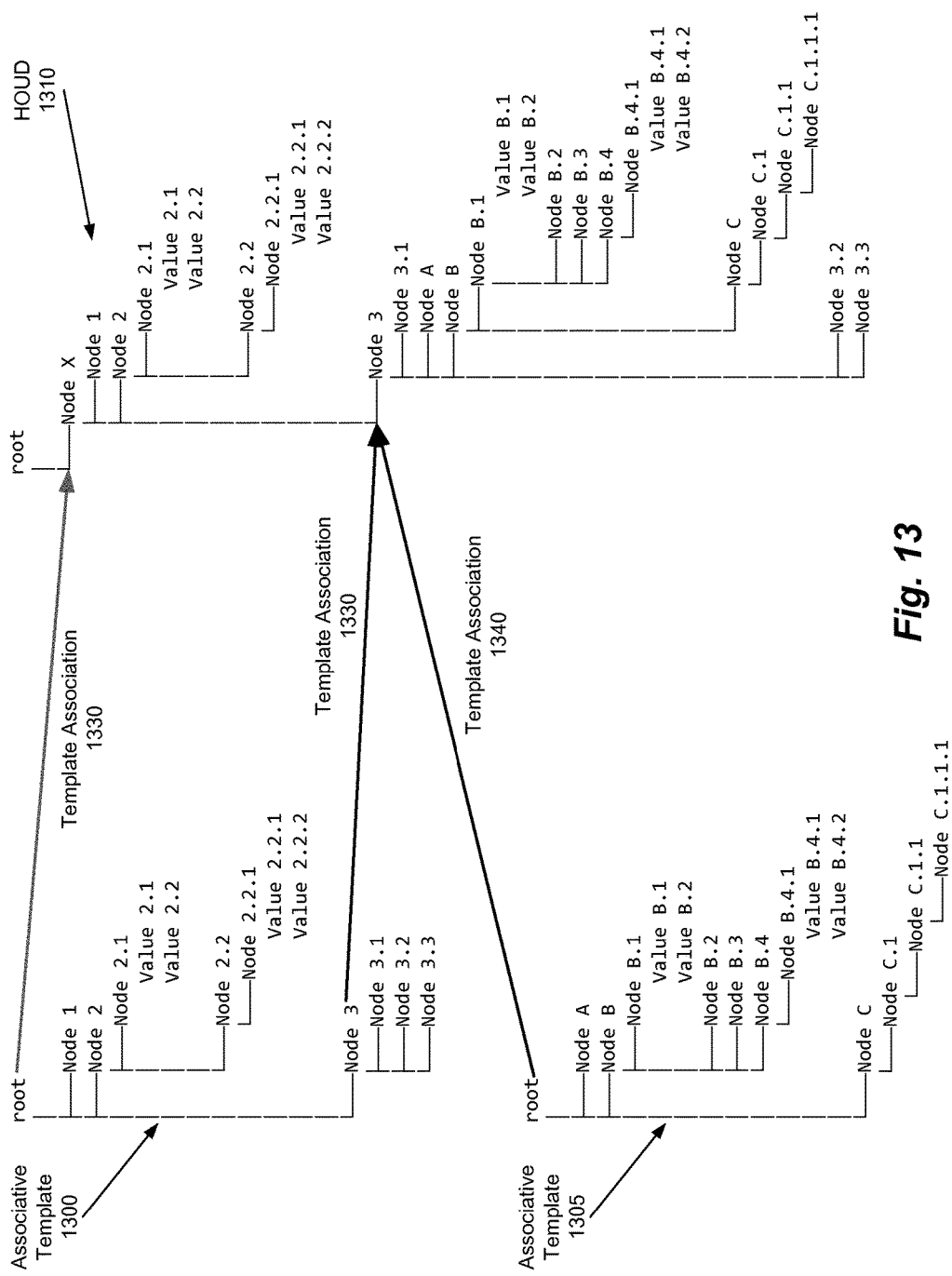
FIG. 13 is a simplified block diagram illustrating an example of associating multiple associative templates to the hierarchical structure of hierarchically-organized unstructured data, according to embodiments of methods and systems such as those disclosed herein.

FIG. 13 is a simplified block diagram illustrating an example of associating multiple associative templates to the hierarchical structure of hierarchically-organized unstructured data, according to embodiments of methods and systems such as those disclosed herein. The example presented in FIG. 13 represents the application of nested templates. Thus, in FIG. 13, two templates (associative templates 1300 and 1305) are associated to a HOUD 1310. As can be seen in FIG. 13, Node 1 and Node 2 at Node X (including their children, along with Values) belong to associative template 1300. Further, each child within Node 3 (including Nodes 3.1, 3.2, 3.3, and values within them) belong to associative template 1305. Further still, Nodes 3.x and Values at Node 3 carry default configuration settings of associative template 1305

As can also be seen in FIG. 13, a number of template associations exist between the nodes of associative templates 1300 and 1305, and those of HOUD 1310. Such template associations include template associations 1320, 1330, and 1340. Template association 1320 is a template association that associates associative template 1300 to HOUD 1310 at Node X. Template association 1330 is a template association that associates to Node 3 of associative template 1300, but is overridden due to the association of associative template 1305 at Node 3. To this end, template association 1340 is a template association that associates associative template 1305 to HOUD 1300 at Node 3, overriding the association of associative template 1300 to HOUD 1300 at Node 3 (by way of template association 1330).

An Example Computing and Network Environment

As shown above, the systems described herein can be implemented using a variety of computer systems and networks. Examples of such computing and network environments are described below with reference to FIGS. 14 and 15.

Figure 14:
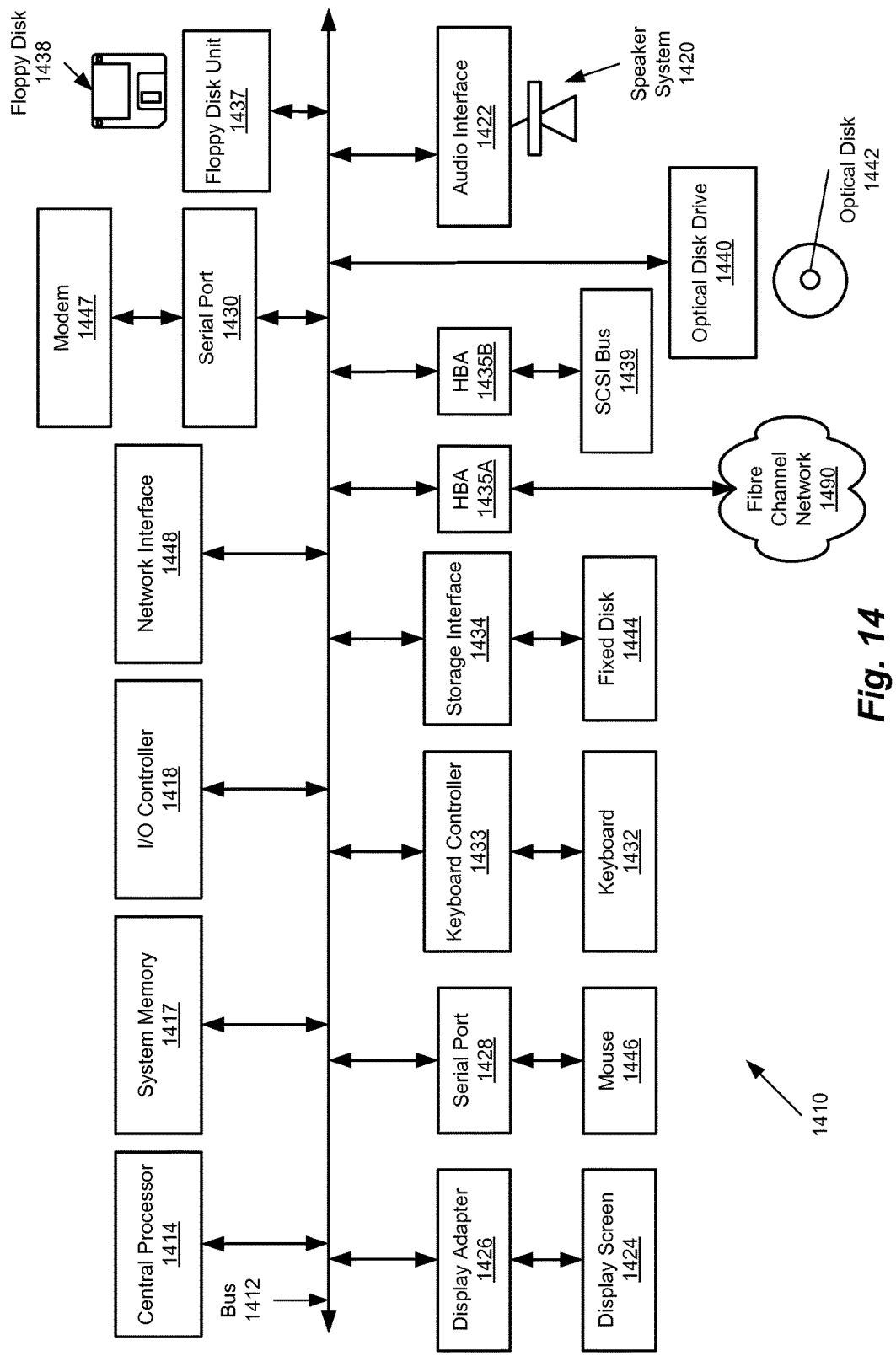
FIG. 14 is a block diagram depicting a computer system suitable for implementing embodiments of methods and systems such as those disclosed herein.

FIG. 14 depicts a block diagram of a computer system 1410 suitable for implementing aspects of the systems described herein. Computer system 1410 includes a bus 1412 which interconnects major subsystems of computer system 1410, such as a central processor 1414, a system memory 1417 (typically RAM, but which may also include ROM, flash RAM, or the like), an input/output controller 1418, an external audio device, such as a speaker system 1420 via an audio output interface 1422, an external device, such as a display screen 1424 via display adapter 1426, serial ports 1428 and 1430, a keyboard 1432 (interfaced with a keyboard controller 1433), a storage interface 1434, a floppy disk drive 1437 operative to receive a floppy disk 1438, a host bus adapter (HBA) interface card 1435A operative to connect with a Fibre Channel network 1490, a host bus adapter (HBA) interface card 1435B operative to connect to a SCSI bus 1439, and an optical disk drive 1440 operative to receive an optical disk 1442. Also included are a mouse 1446 (or other point-and-click device, coupled to bus 1412 via serial port 1428), a modem 1447 (coupled to bus 1412 via serial port 1430), and a network interface 1448 (coupled directly to bus 1412).

Bus 1412 allows data communication between central processor 1414 and system memory 1417, which may include read-only memory (ROM) or flash memory (neither shown), and random access memory (RAM) (not shown), as previously noted. RAM is generally the main memory into which the operating system and application programs are loaded. The ROM or flash memory can contain, among other code, the Basic Input-Output System (BIOS) which controls basic hardware operation such as the interaction with peripheral components. Applications resident with computer system 1410 are generally stored on and accessed from a computer-readable storage medium, such as a hard disk drive (e.g., fixed disk 1444), an optical drive (e.g., optical drive 1440), a floppy disk unit 1437, or other computer-readable storage medium.

Storage interface 1434, as with the other storage interfaces of computer system 1410, can connect to a standard computer-readable medium for storage and/or retrieval of information, such as a fixed disk drive 1444. Fixed disk drive 1444 may be a part of computer system 1410 or may be separate and accessed through other interface systems. Modem 1447 may provide a direct connection to a remote server via a telephone link or to the Internet via an internet service provider (ISP). Network interface 1448 may provide a direct connection to a remote server via a direct network link to the Internet via a POP (point of presence). Network interface 1448 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 14 need not be present to practice the systems described herein. The devices and subsystems can be interconnected in different ways from that shown in FIG. 14. The operation of a computer system such as that shown in FIG. 14 is readily known in the art and is not discussed in detail in this application. Code to implement the modules of the systems described herein can be stored in computer-readable storage media such as one or more of system memory 1417, fixed disk 1444, optical disk 1442, or floppy disk 1438. The operating system provided on computer system 1410 may be MS-DOS®, MS-WINDOWS®, UNIX®, Linux®, or other operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 15:
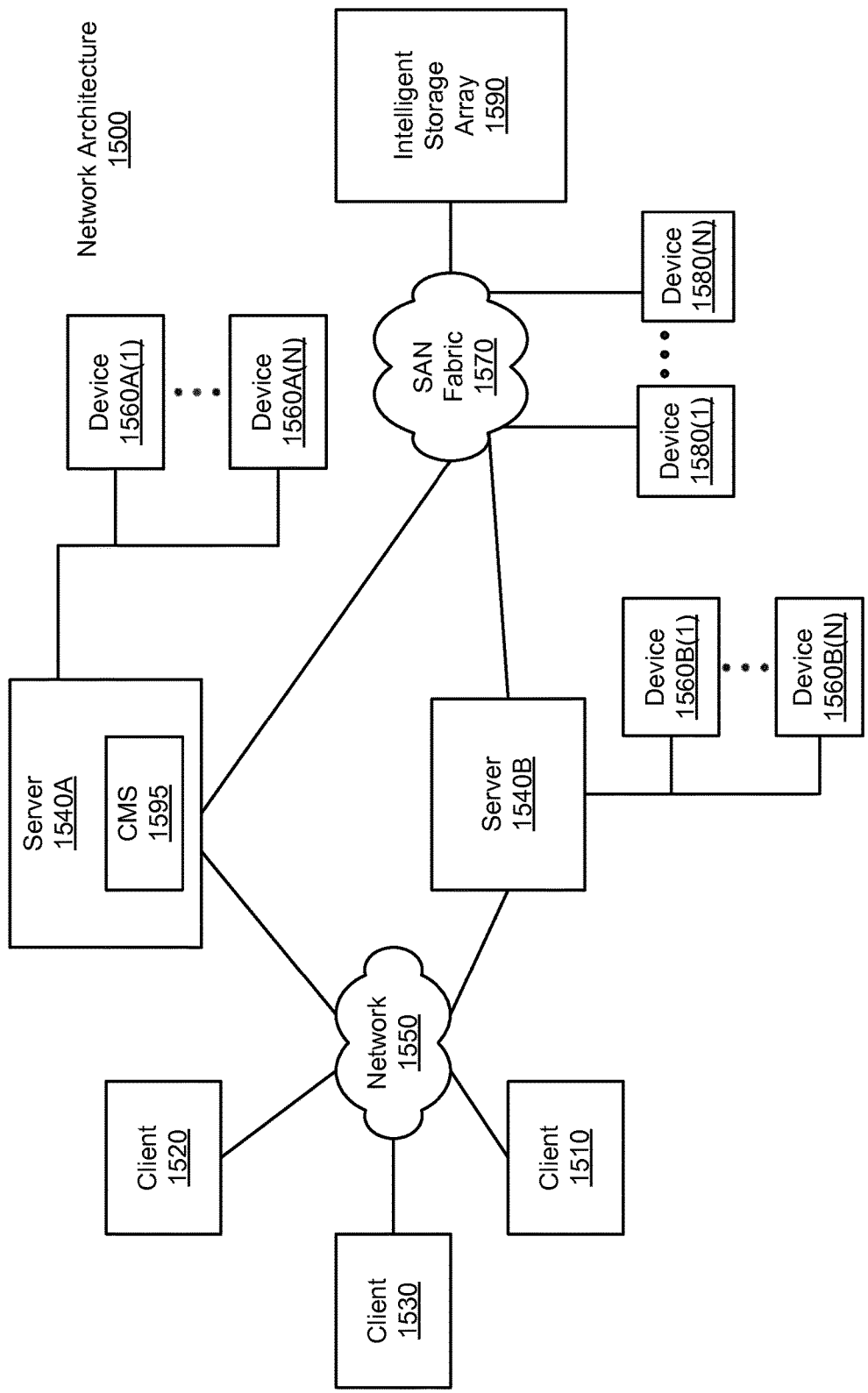
FIG. 15 is a block diagram depicting a network architecture suitable for implementing embodiments of methods and systems such as those disclosed herein.

FIG. 15 is a block diagram depicting a network architecture 1500 in which client systems 1510, 1520 and 1530, as well as storage servers 1540A and 1540B (any of which can be implemented using computer system 1510), are coupled to a network 1550. Storage server 1540A is further depicted as having storage devices 1560A(1)-(N) directly attached, and storage server 1540B is depicted with storage devices 1560B(1)-(N) directly attached. Storage servers 1540A and 1540B are also connected to a SAN fabric 1570, although connection to a storage area network is not required for operation. SAN fabric 1570 supports access to storage devices 1580(1)-(N) by storage servers 1540A and 1540B, and so by client systems 1510, 1520 and 1530 via network 1550. An intelligent storage array 1590 is also shown as an example of a specific storage device accessible via SAN fabric 1570.

Storage server 1540a is also depicted as supporting a configuration management system (CMS) 1595, which can implement methods and systems such as those described herein, and can, in so doing, provide configuration management functionality that allows a user (e.g., a system administrator of network architecture 1500) to manage the configuration of hierarchically-organized unstructured data (not shown) stored in storage devices 1560A(1)-(N), storage devices 1580(1)-(N), intelligent storage array 1590, or other computer-readable storage media, while an associative template (not shown) for such hierarchically-organized unstructured data can be stored, for example, in one or more of storage devices 1560A(1)-(N). CMS 1595 then accesses the associative template in order to perform configuration operations on the hierarchically-organized unstructured data.

With reference to computer system 1410, modem 1447, network interface 1448 or some other method can be used to provide connectivity from each of client computer systems 1510, 1520 and 1530 to network 1550. Client systems 1510, 1520 and 1530 are able to access information on storage server 1540A or 1540B using, for example, a web browser or other client software (not shown). Such a client allows client systems 1510, 1520 and 1530 to access data hosted by storage server 1540A or 1540B or one of storage devices 1560A(1)-(N), 1560B(1)-(N), 1580(1)-(N) or intelligent storage array 1590. FIG. 18 depicts the use of a network such as the Internet for exchanging data, but the systems described herein are not limited to the Internet or any particular network-based environment.

Other Embodiments

The systems described herein are well adapted to attain the advantages mentioned as well as others inherent therein. While such systems have been depicted, described, and are defined by reference to particular descriptions, such references do not imply a limitation on the claims, and no such limitation is to be inferred. The systems described herein are capable of considerable modification, alteration, and equivalents in form and function, as will occur to those ordinarily skilled in the pertinent arts in considering the present disclosure. The depicted and described embodiments are examples only, and are in no way exhaustive of the scope of the claims.

The foregoing describes embodiments including components contained within other components (e.g., the various elements shown as components of computer system 1210). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the systems described herein via the use of block diagrams, flowcharts, and examples. It will be understood by those within the art that each block diagram component, flowchart step, operation and/or component illustrated by the use of examples can be implemented (individually and/or collectively) by a wide range of hardware, software, firmware, or any combination thereof.

The systems described herein have been described in the context of fully functional computer systems; however, those skilled in the art will appreciate that the systems described herein are capable of being distributed as a program product in a variety of forms, and that the systems described herein apply equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative and should not be taken to be limiting. As will be appreciated in light of the present disclosure, other embodiments are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the claims. Variations and modifications of the embodiments disclosed herein can be made based on the description set forth herein, without departing from the scope of the claims, giving full cognizance to equivalents thereto in all respects.

Although the systems described herein have been described in connection with several embodiments, these embodiments and their descriptions are not intended to be limited to the specific forms set forth herein. On the contrary, it is intended that such embodiments address such alternatives, modifications, and equivalents as can be reasonably included within the scope of the appended claims.

What is claimed is:

1. A computer-implemented method for configuration management comprising:
   selecting an associative template from among a plurality of associative templates, wherein
       the associative template that is selected is the associative template that is a closest match to a hierarchical structure of hierarchically-organized unstructured data (HOUD);
   identifying a node in the associative template, wherein
       the node in the associative template is one of a plurality of nodes arranged in a hierarchy as defined in an associative template;
   identifying a location within the hierarchical structure of the HOUD, wherein the location in the hierarchical structure of the HOUD corresponds to the node in the associative template; and
   setting a configuration parameter to a parameter value with respect to the location, wherein
       the configuration parameter for the location is set based on a value of a corresponding parameter for the node as described in the associative template.

2. The method of claim 1, further comprising:
identifying a target node in the HOUD as a template apply point;
selecting a child node of the target node;
determining configuration setting to use in configuring child node; and
configuring child node using the configuration setting.

3. The method of claim 1, further comprising:
identifying a target node in the hierarchy of the HOUD; and
determining whether the target node has a template association with the node in the associative template.

4. The method of claim 3, further comprising:
in response to a determination that the target node has the template association with the node in the associative template,
   enforcing a configuration set of the node in the associative template on the target node.

5. The method of claim 3, further comprising:
in response to a determination that the target node does not have the template association with the node in the associative template,
   selecting a parent node of the target node as a current node, and
   determining whether the current node is a root node of the hierarchy of the HOUD.

6. The method of claim 5, further comprising:
in response to a determination that the current node is not the root node of the hierarchy of the HOUD,
   determining whether the current node has the template association with the node in the associative template, and
   in response to a determination that the current node has the template association with the node in the associative template, enforcing a configuration set of the node in the associative template on the current node.

7. The method of claim 5, further comprising:
in response to a determination that the current node is the root node of the hierarchy of the HOUD,
   enforcing a default configuration set on the current node.

8. The method of claim 1, further comprising:
determining if unstructured data is organized hierarchically; and
in response to a determination that unstructured data is not organized hierarchically, forming the HOUD by organizing the unstructured data hierarchically, wherein
   the forming is accomplished using a common characteristic of the unstructured data.

9. The method of claim 8, further comprising:
defining the associative template, wherein
   the defining the associative template comprises
       defining the hierarchy of the associative template,
       creating the node in the associative template, and
       setting a configuration dimension of the node in the associative template to a parameter value.

10. The method of claim 9, wherein
the defining the hierarchy of the associative template uses
at least one of
structural information, or
a hierarchical organization that resulted from an analysis of the HOUD.

11. A computer program product comprising:
a plurality of instructions, comprising
a first set of instructions, executable on a computer system, configured to select an associative template from among a plurality of associative templates, wherein
the associative template that is selected is the associative template that is a closest match to a hierarchical structure of hierarchically-organized unstructured data (HOUD),
a second set of instructions, executable on the computer system, configured to identify a node in the associative template, wherein
the node in the associative template is one of a plurality of nodes arranged in a hierarchy as defined in an associative template,
a third set of instructions, executable on the computer system, configured to identify a location within the hierarchical structure of the HOUD, wherein
the location in the hierarchical structure of the HOUD corresponds to the node in the associative template, and
a fourth set of instructions, executable on the computer system, configured to set a configuration parameter to a parameter value with respect to the location, wherein
the configuration parameter for the location is set based on a value of a corresponding parameter for the node as described in the associative template; and
a computer-readable storage medium, wherein the instructions are encoded in the computer-readable storage medium.

12. The computer program product of claim 11, wherein the instructions further comprise:
a fifth set of instructions, executable on the computer system, configured to identify a target node in the HOUD as a template apply point;
a sixth set of instructions, executable on the computer system, configured to select a child node of the target node;
a seventh set of instructions, executable on the computer system, configured to determine configuration setting to use in configuring child node; and
a eighth set of instructions, executable on the computer system, configured to configure child node using the configuration setting.

13. The computer program product of claim 11, wherein the instructions further comprise:
a fifth set of instructions, executable on the computer system, configured to identify a target node in the hierarchy of the HOUD; and
a sixth set of instructions, executable on the computer system, configured to determine whether the target node has a template association with the node in the associative template.

14. The computer program product of claim 13, wherein the instructions further comprise:
a seventh set of instructions, executable on the computer system, configured to, in response to a determination that the target node has the template association with the node in the associative template,
enforce a configuration set of the node in the associative template on the target node.

15. The computer program product of claim 13, wherein the instructions further comprise:
a seventh set of instructions, executable on the computer system, configured to, in response to a determination that the target node does not have the template association with the node in the associative template,
select a parent node of the target node as a current node, and
determine whether the current node is a root node of the hierarchy of the HOUD.

16. The computer program product of claim 15, wherein the instructions further comprise:
a eighth set of instructions, executable on the computer system, configured to, in response to a determination that the current node is not the root node of the hierarchy of the HOUD,
determine whether the current node has the template association with the node in the associative template, and
in response to a determination that the current node has the template association with the node in the associative template, enforce a configuration set of the node in the associative template on the current node.

17. The computer program product of claim 15, wherein the instructions further comprise:
a eighth set of instructions, executable on the computer system, configured to, in response to a determination that the current node is the root node of the hierarchy of the HOUD,
enforce a default configuration set on the current node.

18. The computer program product of claim 11, wherein the instructions further comprise:
a fifth set of instructions, executable on the computer system, configured to determine if unstructured data is organized hierarchically; and
a sixth set of instructions, executable on the computer system, configured to, in response to a determination that unstructured data is not organized hierarchically, form the HOUD by organizing the unstructured data hierarchically, wherein
a common characteristic of the unstructured data is used, at least in part, to form the HOUD.

19. The computer program product of claim 11, wherein the instructions further comprise:
a fifth set of instructions, executable on the computer system, configured to define the hierarchy of the associative template, wherein
the fifth set of instructions comprises
a first subset of instructions, executable on the computer system, configured to define the hierarchy of the associative template,
a second subset of instructions, executable on the computer system, configured to create the node in the associative template, and
a third subset of instructions, executable on the computer system, configured to set a configuration dimension of the node in the associative template to a parameter value, and
the first subset of instructions uses at least one of
structural information, or
a hierarchical organization that resulted from an analysis of the HOUD.

20. A computer system comprising:
one or more processors;
a computer-readable storage medium coupled to the one or more processors; and
a plurality of instructions, encoded in the computer-readable storage medium and configured to cause the one or more processors to
   select an associative template from among a plurality of associative templates, wherein
      the associative template that is selected is the associative template that is a closest match to a hierarchical structure of hierarchically-organized unstructured data (HOUD);
   identify a node in the associative template, wherein
      the node in the associative template is one of a plurality of nodes arranged in a hierarchy as defined in an associative template,
   identify a location within the hierarchical structure of the HOUD, wherein the location in the hierarchical structure of the HOUD corresponds to the node in the associative template, and
   setting a configuration parameter to a parameter value with respect to the location, wherein
      the configuration parameter for the location is set based on a value of a corresponding parameter for the node as described in the associative template.

* * * * *